United States Patent [19]

Tecchio et al.

[11] Patent Number: 5,456,027
[45] Date of Patent: Oct. 10, 1995

[54] ATHLETIC SHOE WITH A DETACHABLE SOLE HAVING AN ELECTRONIC BREAKAWAY SYSTEM

[75] Inventors: Vincent G. Tecchio, 18 Winchester Dr., Howell, N.J. 07731; Russell Salt, Allentown, N.J.

[73] Assignee: Tecchio; Vincent G., Howell, N.J.

[21] Appl. No.: 225,144

[22] Filed: Apr. 8, 1994

[51] Int. Cl.⁶ .................... A43B 3/24; A63C 9/00
[52] U.S. Cl. .................... 36/134; 36/15; 36/132; 280/612; 280/DIG. 13; 403/321
[58] Field of Search .............. 36/15, 132, 134, 36/42; 403/5, 15, 31, 321, 322, 324, 325; 280/DIG. 13, 612

[56] References Cited

U.S. PATENT DOCUMENTS

| | | | |
|---|---|---|---|
| 3,782,011 | 1/1974 | Fisher. | |
| 3,982,336 | 9/1976 | Herro. | |
| 4,135,733 | 1/1979 | Salomon | 280/612 |
| 4,291,894 | 9/1981 | D'Antonio et al. | 280/612 |
| 4,395,759 | 7/1983 | D'Antonio et al. | 280/612 |
| 4,465,294 | 8/1984 | Spitaler et al. | 280/612 |
| 4,494,768 | 1/1985 | Hull | 280/612 |
| 4,572,539 | 2/1986 | Salomon | 280/612 |
| 4,833,760 | 5/1989 | Sundström | 403/31 |
| 4,873,774 | 10/1989 | Lafever. | |
| 4,923,320 | 5/1990 | Klischat | 403/15 |
| 5,255,453 | 10/1993 | Weiss | 36/134 |
| 5,317,822 | 6/1994 | Johnson | 36/15 |

Primary Examiner—Paul T. Sewell
Assistant Examiner—Marie Denise Patterson
Attorney, Agent, or Firm—Ezra Sutton

[57] ABSTRACT

The present invention provides an athletic shoe with a detachable sole having an electronic sensing and breakaway system. An upper sole member is detachably connected to a lower sole member which may have a plurality of cleats attached to the bottom of the lower sole member. There are a series of latch mechanisms which detachably hold the upper and lower sole members together, which protrude from the upper sole member and terminate in recesses in the lower sole member. The latch mechanisms are spring-biased toward a retracted position and are held in the extended latching position against the spring force by a system of pressurized fluid. Additionally, there are a number of strain gauges or sensors in the upper sole member and extend into recesses of the lower sole member. These strain gauges continuously sense the shear force applied to the cleats or sole when in use and emit a signal to a trigger mechanism located in the upper sole member when the shear force exceeds a pre-set level. A release mechanism is actuated when the shear force has reached its predetermined stress level for the wearer of the athletic shoes during the occurrence of a high-level torque or shear force incident. There are control means provided for adjusting the pre-set shear force which must be exceeded to actuate the trigger mechanism.

41 Claims, 13 Drawing Sheets

ATHLETIC SHOE WITH A DETACHABLE SOLE HAVING AN ELECTRONIC BREAKAWAY SYSTEM

FIELD OF THE INVENTION

The present invention relates to an athletic shoe having a detachable lower sole with or without athletic cleats, wherein the lower sole automatically detaches from the athletic shoe when a predetermined shear force is exceeded in order to prevent injuries to the athlete's hip, leg, knee, ankle, and foot.

BACKGROUND OF THE INVENTION

Present athletic shoes have the problem that the sole or cleats become embedded or locked on or in the playing surface, such as turf, grass, clay, or wood and prevent the athlete from freely turning or moving his leg or foot against the high torque created and applied to the hip, leg, knee, ankle, or foot of the athlete. As a result, many athletes suffer injuries to the hip, leg, knee, ankle, or foot.

There are many types of athletic footwear having cleats that have been designed to minimize injuries to the athlete wearing a particular type of footwear, including footwear for football, soccer, field hockey, baseball, rugby, lacrosse, etc., or cleatless athletic shoes for basketball, tennis, volleyball, racquetball, etc. The above sports need an athletic shoe that responds to the needs of the athlete but also takes into account the distinctive characteristics of that athletic endeavor.

The desired athletic footwear should be able to adjust to many factors, including the weight and size of the athlete, the degree of athleticism of that individual, the types of maneuvers that are expected in the playing of that sport, the type of surface played on, and weather conditions that are prevalent at the time of play for the type of surface being played on. Thus, the athletic shoe should have different release settings for predetermined torques.

For example, in pro-football, the quarterback, running back, end, defensive back, etc., need to be extremely mobile, executing sharp cuts, turns, running backwards and forward at full speed, and withstand being tackled when the athlete has his foot firmly planted in the ground. The athletic footwear worn by that athlete should take into account his weight and size, since a heavier and larger athlete may need a higher torque/force setting than a smaller and lighter athlete. The quarterback may need a lower torque setting because of his constant sharp turns, whereas the offensive and defensive lineman may need a higher torque setting because their movement is limited. The athleticism of the individual is also a factor because that athlete may be able to take a higher torque setting due to his ability to take a higher amount of physical punishment to his lower extremities for a longer period of time. The peculiarities of the sport are important, whereas the lineman may need fewer and longer cleats versus the quarterback needing more and shorter cleats, etc., for the type of action involved in that sport.

The type of field played on controls the type of cleats that are used, depending on whether the athlete is on artificial (Astro) turf versus a natural grass turf. The quarterback may need a shorter cleat in the Astro turf because the Astro turf is not as resilient versus using a longer cleat because the natural grass field is more resilient where the longer cleat may not get stuck in the dirt. Finally, weather conditions will affect the type of cleat being used on the playing field, where for, example, on a frozen grass field, the cleat could be shorter because it reacts more like an Astro turf playing field. On a muddy field, the cleat could be longer because the field may be very forgiving, and the quarterback may need that extra traction for maneuvering around.

At present, most athletic footwear does not adjust for many of these factors previously mentioned, whereby the safety of that athlete may be in constant jeopardy and subject to some type of hip, leg, knee, ankle, or foot injury in the course of playing their sport. Accordingly, it would be desirable to provide a new and improved athletic shoe which takes all of these factors into account and substantially reduces the likelihood of injury.

DESCRIPTION OF PRIOR ART

Prior patents in this field have not provided satisfactory solutions to these problems.

U.S. Pat. No. 3,782,011 is directed to a safety sole for a cleated sport shoe in which the cleats are secured to the shoe through flat, zig-zag springs. The springs are sufficiently stiff that they prevent the cleats from moving with respect to the remainder of the shoe under normal playing conditions. However, when subjected to excessive lateral forces, the springs permit limited movement of the cleats with respect to the shoe so as to reduce injuries to a player's ankles or knees. This invention uses only mechanical means for movement of the cleats when there is an excessive amount of lateral force applied to the cleated sport shoe when in use. There is no structural arrangement for the upper sole member to break away from the lower sole member or a device to detect an excessive amount of force being applied to the lower sole of the shoe during play.

U.S. Pat. No. 4,873,774 is directed to a shoe sole having retractable cleats. The sole is formed with a plurality of chambers, each of which includes a cleat attached to a cleat plate for movement between extended and retracted positions. A source of fluid pressure urges the cleat plate and the attached cleat toward the extended position against the action of a spring which biases the cleats toward the retracted position. A manual pump supplies fluid pressure to the chambers for urging the springs toward the extended position, and a valve releases the fluid pressure from the chambers so that the cleats will be retracted by the spring force. However, this patent only shows the retraction of the cleats into its chambers when the shear force exceeds a certain value. Again, there is no structural arrangement for the upper sole member to break away from a lower sole member or a device to detect an excessive amount of force applied to the cleated area when in use.

U.S. Pat. No. 5,255,453 is directed to an athletic shoe in which the sole has a lower surface and a heel portion and a plurality of cleats attached thereof. Each cleat having or using a break means for breaking the cleat away from the sole of the shoe, such as by using either a break portion or an adhesive layer on the top portion of each cleat which is bonded to the sole's lower surface that is used to hold each cleat on the sole of the shoe. Both the adhesive layer and the breaking portion of each cleat has a preselected failure shear force factor for the occurrence of which causes a separation of each cleat from the sole, thereby avoiding injury. However, this patent uses either a chemical bonding system or the knowledge of the physical properties of material shear rates to determine the failure shear stress of the adhesive or materials used for the cleat and sole. There are no moving parts in the detachment of cleats from the base of the sole nor is there any specific arrangement showing a detachable upper member from a lower sole member of the shoe. This patent has no means of automatically detaching the lower sole member from an upper sole member by the use of an electronic sensing device.

U.S. Pat. No. 3982,336 is directed to an athletic shoe having a detachable cleated sole. The bottom of the sole has a number of tapered projections which mate with corresponding tapered grooves on the top of the sole. Both the projections and the grooves are undercut to hold the sole and shoe together under normal playing conditions. When a lateral force from the outer vamp side to the inner vamp side of the shoe exceeds a certain value, however, the sole will detach from the remainder of the shoe. Application of a lateral force in the other direction, i.e., from the inner vamp side toward the outer vamp side of the shoe, such as by a player making a sharp cut, will not cause detachment. However, this patent uses only a mechanical system with no moving parts in the detachment of cleats from the base of the cleated sole, thereby providing a detachable sole. This patent has no means of automatically detaching the cleated sole by the use of an electronic sensing device.

SUMMARY OF THE INVENTION

The present invention provides an athletic shoe with a detachable sole having an electronic sensing and breakaway system. This athletic shoe includes preferably an upper shoe vertical member for the foot and ankle portion of the leg, which gives the proper support for the foot and ankle, and an upper sole member which forms the body of the athletic shoe when attached to said upper shoe vertical member.

The upper sole member is detachably connected to a lower sole member which forms the detachable sole component of the athletic shoe, and the lower sole member may have a plurality of cleats attached to the bottom of the lower sole member.

Within the detachable sole component of the athletic shoe, there is a series of latch mechanisms which detachably hold the upper and lower sole members together. The series of latch mechanisms protrude from the upper sole member and terminate in enlarged heads for engagement within recesses in the lower sole member. Although the latch mechanisms are spring-biased toward a retracted position, they are held in the extended latching position against the spring force by a system of pressurized fluid.

Additionally, there are a number of strain gauges or sensors (at least two or more) that are an integral part of the upper sole member and extends into recesses of the lower sole member. Power for the strain gauge sensors for the electronic breakaway system is provided by a small power cell housed in the upper sole member. These strain gauges continuously sense the shear force applied to the cleats or sole when in use and emit a signal to a trigger mechanism cooperatively located in the upper sole member when the shear force exceeds a pre-set level. This opens a valve, which then releases fluid that eliminates pressure on the latch mechanisms. With the fluid pressure eliminated, all the latch mechanisms are pulled to the retracted position by the biasing springs, thereby releasing the lower sole member from the upper sole member. The release mechanism is actuated when the shear force has reached its predetermined stress level for the wearer of the athletic shoes during the occurrence of a high-level torque or shear force incident. There are control means provided for adjusting the pre-set shear force which must be exceeded to actuate the trigger mechanism.

The latch mechanisms may be brought back to the extended position for rejoining the upper and lower sole members of the detachable sole component by operating a manual pump which repressurizes the fluid system. The manual pump is an integral component of the upper sole member. Also, the adjustable release mechanism could be reset to a higher or lower shear force setting dependent upon the needs of the athlete. The adjustable release mechanism is also an integral component of the upper sole member.

It is an object of the present invention to provide an athletic shoe with a detachable lower sole member wherein an electronic breakaway system operates to substantially reduce the occurrence of hip, leg, knee, ankle, and foot injuries to the wearer.

It is a further object of the present invention to provide retractable latching mechanisms for releasably holding the lower sole to the bottom of the shoe.

It is a further object of the present invention to provide electronic strain gauges for sensing the shear force and initiating detachment of the upper and lower sole members in response to a preset level of shear force being reached.

It is a further object of the present invention to provide a reusable system wherein once the lower sole member breaks away from the upper sole member, it can be reattached to the upper sole member, and the athletic shoe can be used again for further play.

It is a further object of the present invention to provide an athletic shoe having interchangeable lower sole members to eliminate the need for purchasing many different athletic shoes.

It is further object of the present invention to provide a detachable breakaway system for use in other applications, such as in breakaway supports or poles for road signs and signaling devices, breakaway seats for aircraft, a detachable power supply for a space shuttle, breakaway belt feeders to prevent injuries to a worker's hands or feet, which prevents them from getting stuck in the belt apparatus, or a breakaway stop mechanism for escalators when a person or object gets stuck in the escalator's moving stair, and a breakaway system for pulleys or fans.

BRIEF DESCRIPTION OF THE DRAWINGS

Further objects, features, and advantages of the present invention will become apparent upon the consideration of the following detailed description of the presently-preferred embodiment when taken in conjunction with the accompanying drawings, wherein.

DETAILED DESCRIPTION OF THE PREFERRED EMBODIMENT

OVERALL ARRANGEMENT OF ATHLETIC SHOE

Figure 1:
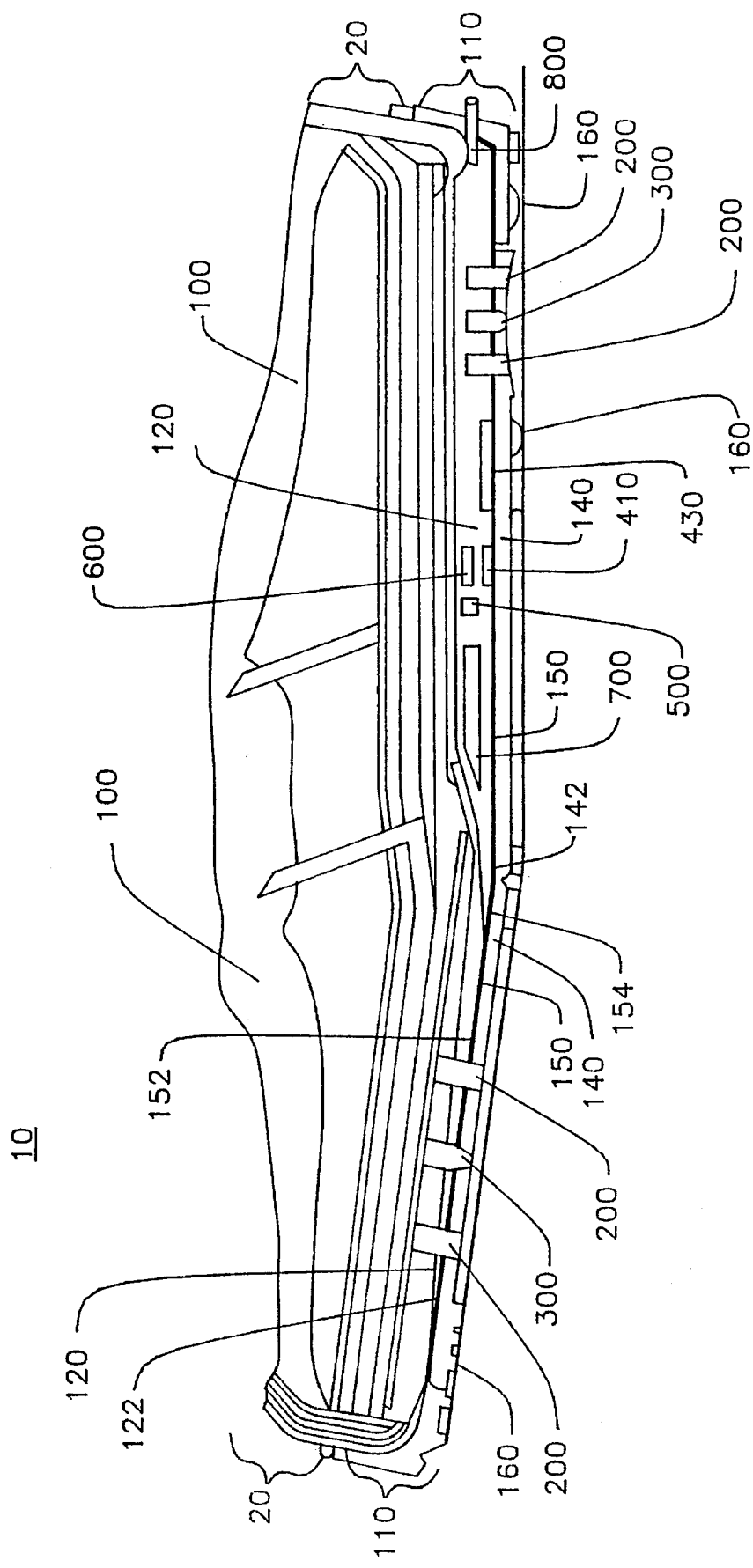
FIG. 1 is a cut-away side view of the present invention of the athletic shoe with all of the major components being shown, including the detachable lower sole member, the electronic sensing system, the latch mechanisms, the trigger mechanism, the reservoir and bladder system, and the adjustable release mechanism.

FIG. 1 shows an athletic shoe 10 comprising an upper shoe vertical member 100 for the ankle and foot and an upper sole member 120, which forms the body 20 when attached in a permanent manner to the upper shoe vertical member 100. The body 20 forms the enclosure portion of the athletic shoe 10, which gives the wearer the comfort and proper support for the foot and ankle portion of the leg. "The body being made from canvas, nylon, leather, or plastic."

The detachable sole system 110, as shown in FIG. 1, includes the upper sole member 120 that detachably connects with the lower sole member 140, and a plurality of cleats 160 attached to the bottom of the lower sole member 140. However, in other embodiments, the present invention may be employed on shoes without cleats, such as in tennis and basketball. Between the upper sole member 120 and lower sole member 140, there is a slip surface 150 made of TEFLON coating. The top slip surface 152 is integrally and permanently attached to the bottom 122 of the upper sole member 120, and the bottom slip surface 154 is integrally and permanently attached to the top 142 of the lower sole member 140. The Teflon slip surface 150 facilitates the separation of the upper sole member 120 from the lower sole member 140 when the detachable sole system 110 is activated.

Within the detachable sole system 110 shown in FIG. 1, the upper and lower sole members 120 and 140 have several major components that are cooperatively connected therein. These components are responsible for the breakaway function of the lower sole member 140 and plurality of cleats 160 when they detach from the upper sole member 120. The system components include the latching mechanisms 200, the electronic sensor 300, the electronic control system 400, the adjustable release mechanism 500, the trigger mechanism 600, the reservoir and bladder system 700, and the manual reset mechanism 800.

LATCHING MECHANISMS 200

Figure 2:
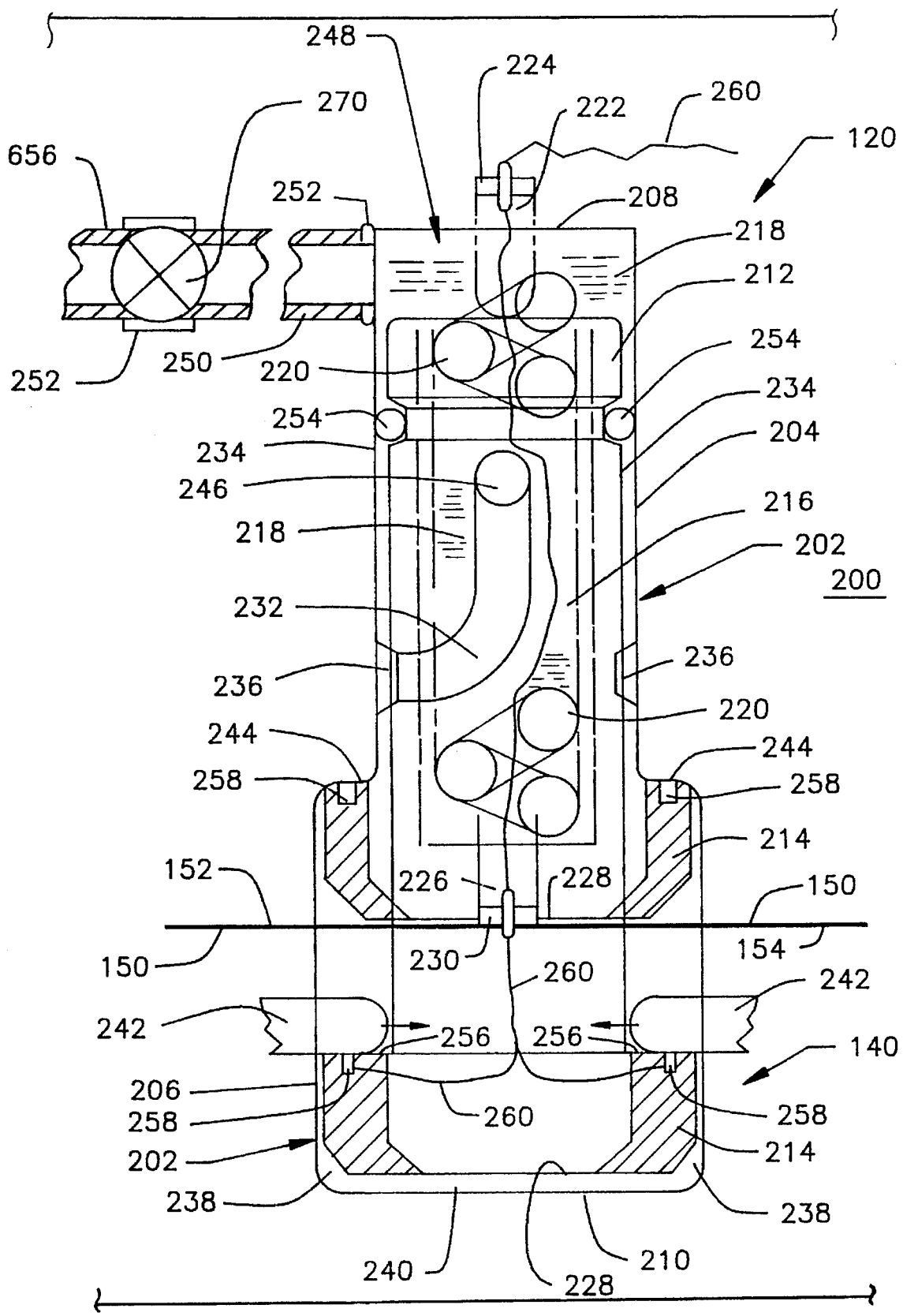
FIG. 2 is a side view of the present invention showing the latch mechanism.

As shown in FIG. 1, latching mechanisms 200 are located strategically throughout the detachable sole system 110, and there may be up to 20 of them. Each latching mechanism 200, as depicted in FIG. 2, is housed in a two-part metal cylindrical receptacle 202 molded within the upper and lower sole members 120 and 140 having an upper section 204 and a lower section 206 and a top and bottom surface 208 and 210. The upper and lower sections 204 and 206 are separated at a slip surface 150 intercept. A hollow latch piston shaft 212 of cylindrical shape is internally located in the two-part metal cylindrical receptacle 202, and shaft 212 is approximately 0.288 of an inch in length and 0.125 of an inch in diameter and has a latch piston head 214 at the bottom thereof, which is approximately 0.188 of an inch in diameter. Piston shaft 212 has a hollow cylindrical cavity 216 containing pressurized chamber fluid 218 and a return biasing spring 220 extending throughout the length of cavity 216. The upper part 222 of the return biasing spring 220 is permanently attached to the top surface 208 of metal cylindrical housing 202 by silver soldering 224. The lower part 226 of the return biasing spring 220 is permanently attached to inside wall 228 of the latch piston head 214 by silver soldering 230.

Two curved latch tracking channels 232 are machined into opposite sides of outer sidewall 234 of the latch piston shaft 212 in a curved manner and are 180° apart. Stationary guide pins 236 are mounted on the inside wall of upper section 204 and are 180° apart. The curved latch tracking channels 232 move relative to stationary guide pins 236 and thereby rotate the latch piston shaft 212 by 90° as it moves up and down within receptacle 202 and into and out as latch-receiving recess 238. There is approximately 0.010 of an inch clearance between the latch-receiving base 240 and the bottom surface 228 of latch piston head 214.

Two spring-loaded locking bars 242 are located in the lower wall section 206 of metal housing 202 and are 180° apart. When the spring-loaded locking bars 242 are in their forward or inner position, they hold the latch piston head 214 in its lower or engaged position within recess 238. A system engage sensor contacts 258 is attached to the chamfer surface area 256 and has a circuit wire 260 connected to the contacts 258 for transmission of an electronic signal. As latch piston shaft 212 moves upwardly to its disengaged position, its uppermost movement is limited by abutment member 244 and the end 246 of the curved latch tracking channels 232 in the engaged position.

The latch fluid chamber 248 containing the pressurized chamber fluid 218 has an inlet/outlet tube 250 that is permanently attached into the upper wall section 204 of metal housing 202 by way of a silver soldered end tack 252. An outgoing fluid microcheck valve 270 is attached to each outlet tube 250 by way of a silver soldering tack 252. The pressurized chamber fluid 218 comes from the main fluid reservoir 716 via the manual reset pump 800, in a manner to be explained. O-ring 254 surrounds piston shaft 212 and move with it to keep the pressurized reservoir fluid 218 from leaking out to the slip surface 150 intercept.

FIG. 2 shows the operation of each latching mechanism 200 for releasably holding the lower sole member 140 to the upper sole member 120 of the athletic shoe 10. When the latching mechanism 200 is in the disengaged or upper position, it is in a non-pressurized state, and the latch piston shaft 212 is in an upper retracted position in the upper sole member 120, and latch piston head 214 is flush with the top of slip surface 150. The latch piston shaft 212 is rotatably moved to this upper position by the contracting force of return biasing spring 220 when the pressurized chamber fluid 218 is eliminated from the latch fluid chamber 248 by way of the inlet/outlet tube 250 and microcheck valve 270.

To move the latching mechanism 200 to the lower engaged position or pressurized state, whereby the latch piston shaft 212 is rotatably moved along the curved latch tracking channels 232 in a downward movement by the force of the pressurized reservoir fluid 218 being returned to the hollow cylindrical cavity 216 and the latch fluid chamber 248 by way of the fluid inlet/outlet tube 250. During this downward movement, spring 220 expands. When the latch piston head 214 is in its lower and engaged position within the latch-receiving recess 238, the set of spring-loaded locking bars 242 is automatically moved inwardly onto the chamfer surface area 256 of latch piston head 214, which then securely holds the latch piston head 214 in its engaged position. The system engage sensor contact 258 sends an electronic signal by way of circuit wire 260, verifying that the locking bars 242 are in their forward locked position. Each latching mechanism 200 is connected to inlet/outlet tube 250 that carries the pressurized chamber fluid 218 back to a reservoir 716 when trigger mechanism 600 is activated.

The latching mechanism 200 is connected to the electronic control circuit 400 via circuit wires 260 for signal verification as to when the latch mechanism 200 has engaged and locked the lower sole member 140 into the upper sole member 120.

ELECTRONIC SENSOR ASSEMBLY 300

Figure 3:
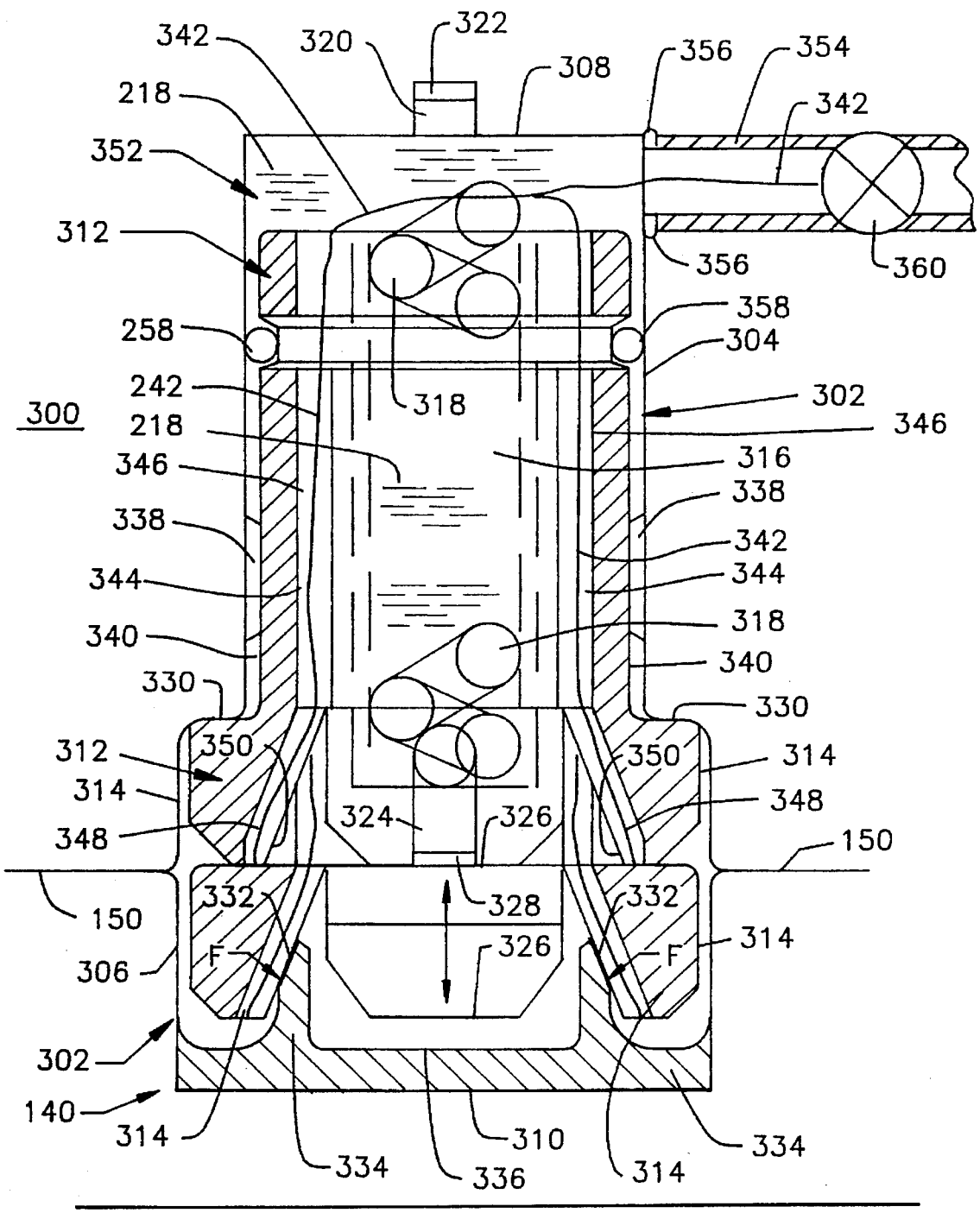
FIG. 3 is a side view of the present invention showing the electronic sensor assembly component.

Two electronic sensor assemblies 300, as shown in FIG. 1, are precisely located at the heel and ball of the foot portion of athletic shoe 10 within the detachable sole system 110. For example, one sensor assembly 300 is located at the heel pressure point, at approximately 1⅝ inches from the end of the heel and approximately 1⅝ inches from the outer side of the heel. The other sensor assembly 300 is located at the ball of the foot, at approximately 4⅜ inches from the front end of the sole and approximately 2⅞ inches from the outer side of the sole. Each electronic sensor assembly 300, as depicted in FIG. 3, is housed in a two-part metal cylindrical housing 302 molded within the upper and lower sole members 120 and 140. The metal cylindrical housing 302 has an upper section 304, a lower section 306, and top and bottom surfaces 308 and 310. The upper and lower sections 304 and 306 are separated at a slip surface 150 intercept. A hollow electronic sensor piston shaft 312 is internally located in the two-part metal cylindrical housing 302, and piston shaft 312 is approximately 0.288 of an inch in length and 0.188 of an inch in diameter and has an electronic sensor piston head 314 at the bottom thereof, which is approximately 0.250 of an inch in diameter. Electronic sensor piston shaft 312 has an internal cylindrical cavity 316 containing pressurized chamber fluid 218 and a return biasing spring 318 extending throughout the length of cavity 316. The upper part 320 of the return biasing spring 318 is permanently attached to the top surface 308 of metal cylindrical housing 302 by silver soldering 322. The lower part 324 of the return biasing spring 318 is permanently attached to the inside wall 326 of the electronic sensor piston head 314 by silver soldering 328.

In the vertical movement of the electronic sensor piston shaft 312, the shaft's uppermost movement is limited by abutment member 330, and the shaft's lowermost position is stopped when it engages the angular side 332 of the tapered recesses 334 of the electronic sensor 300. The angular tapered side 332 is the surface area that senses the torque/force being applied by an external pressure when in the engaged position. There is an approximately 0.010 of an inch clearance between the electronic sensor tapered-receiving base 336 and the piston head bottom surface 326.

Support ribs 338, four in total, guide the electronic sensor piston shaft 312 in its vertical movement, so there is no skewing of the piston shaft 312, thereby decreasing the possibility of generating a false electronic sensor reading. The support ribs 338 are permanently attached to the outer sidewalls 340 of the electronic sensor piston shaft 312 and are 90° apart.

Strain gauge electrical leads 342, which are covered in a waterproof epoxy material 344, are located within four electronic sensor channels 346. The four electronic sensor channels 346 are 90° apart and are located between the outer sidewall 340 and the hollowed cavity 316 and within the solid metal wall portion of piston shaft 312. The lower section 348 of the strain gauge electrical leads 342 are permanently bonded to a tapered angular inside surface 350 of piston shaft head 314. The strain gauge electrical leads 348 within the inside surface 350 of piston shaft head 314 are responsible for sending a signalled response through strain gauge electrical leads 342 when a force is applied to the angular tapered side 332 of the tapered recesses 334.

The electronic sensor fluid chamber 352 containing the pressurized chamber fluid 218 has an inlet/outlet tube 354 that is permanently attached into the upper wall section 304 of metal housing 302 by way of a silver soldered end tack 356. An outgoing fluid microcheck valve 360 is attached to each outlet tube 354 by way of a silver soldering tack 356. The pressurized chamber fluid 218 comes from the main fluid reservoir 716 via the manual reset pump 800, in a manner to be explained. O-ring 358 surrounds piston shaft 312 and move with it to keep the pressurized chamber fluid 218 from leaking out to the slip surface 150 intercept.

FIG. 3 shows the operation of the electronic sensor assembly 300 for sensing the electronic signal from the strain gauge electrical lead wires 342 when in the engaged (lowered) position. When a force F is applied to each sensor assembly 300 on its surface area 350, an electronic signal is transferred along the strain gauge electrical lead wires 342 to the electronic control device 430 and that electronic signal is a millivolt D.C. electrical impulse. When the sensed force is not excessive, piston shaft 312 does not move. In response to sensing an excessive force F, the electronic sensor piston shaft 312 will retract into the upper sole member 120 of athletic shoe 20, so that the electronic sensor piston head 314 is flush with the top of slip surface 150. The piston shaft 312 is moved to the upper position (disengaged) by the contracting force of the return biasing spring 318 when the pressurized chamber fluid 218 is eliminated from the electronic sensor fluid chamber 352 by way of the inlet/outlet tube 354 and microcheck valve 360.

To re-engage the electronic sensor assembly 300 to the lower or engaged position (pressurized state), the sensor piston shaft 312 is moved downwardly along the plurality of side support ribs 338 by the force of the pressurized reservoir fluid 218 being returned to the hollowed cylindrical cavity 316 and electronic sensor fluid chamber 352 by way of the fluid inlet/outlet tube 354. During this movement, spring 318 is caused to expand. The downward movement stops when the angular piston head surface 350 engages the angular-receiving recess surface.332. Then the electronic sensor assembly 300 is again ready to receive an applied force F and send a representative signal via the strain gauge wires 342. Each electronic sensor assembly 300 is connected to inlet/outlet tube 354 that carries the pressurized chamber fluid 218 back to a reservoir 716 when trigger mechanism 600 is activated.

ELECTRONIC CONTROL SYSTEM 400

Figure 4:
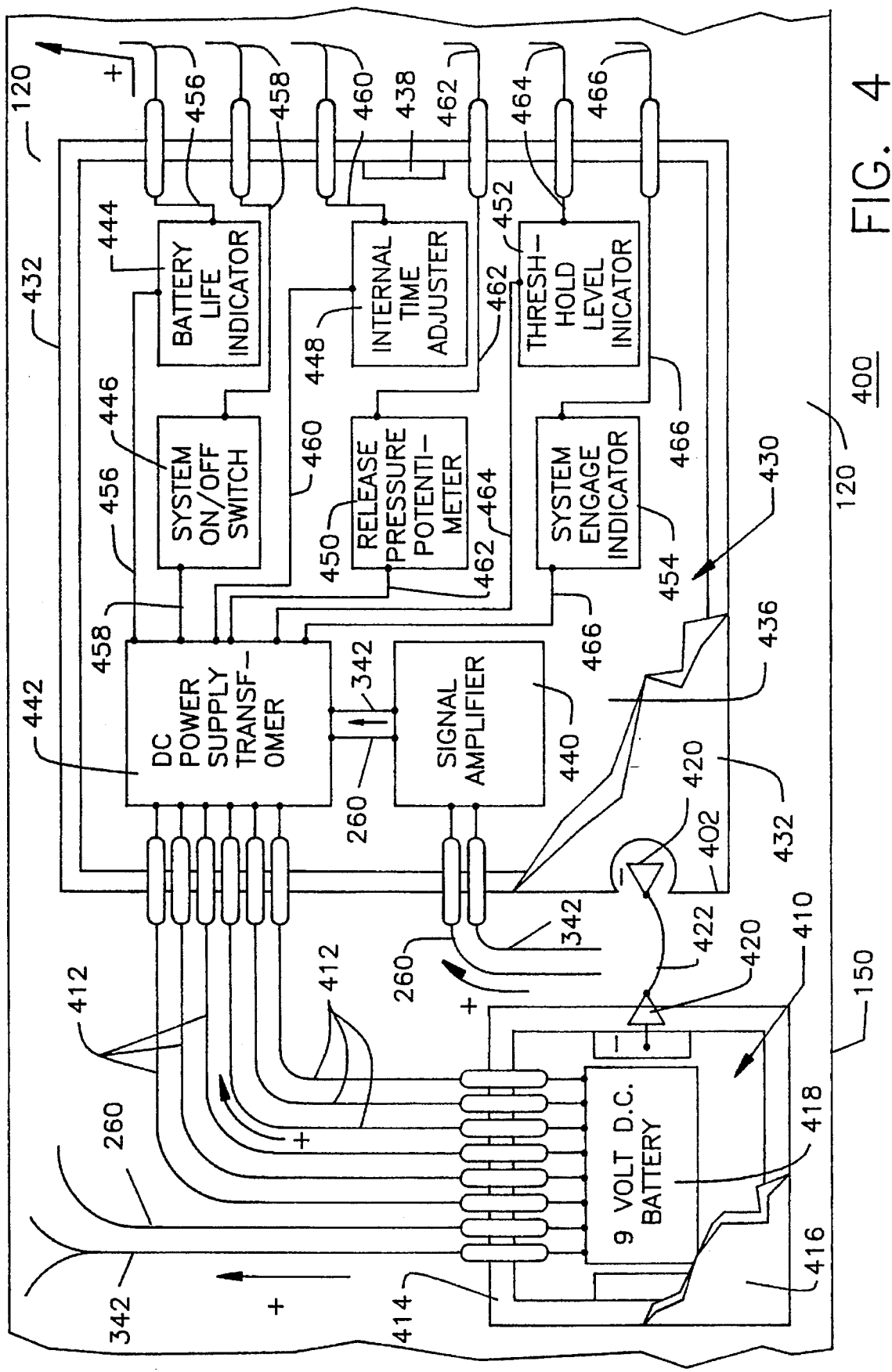
FIG. 4 is a side view of the present invention showing the electronic control system components.
Figure 10:
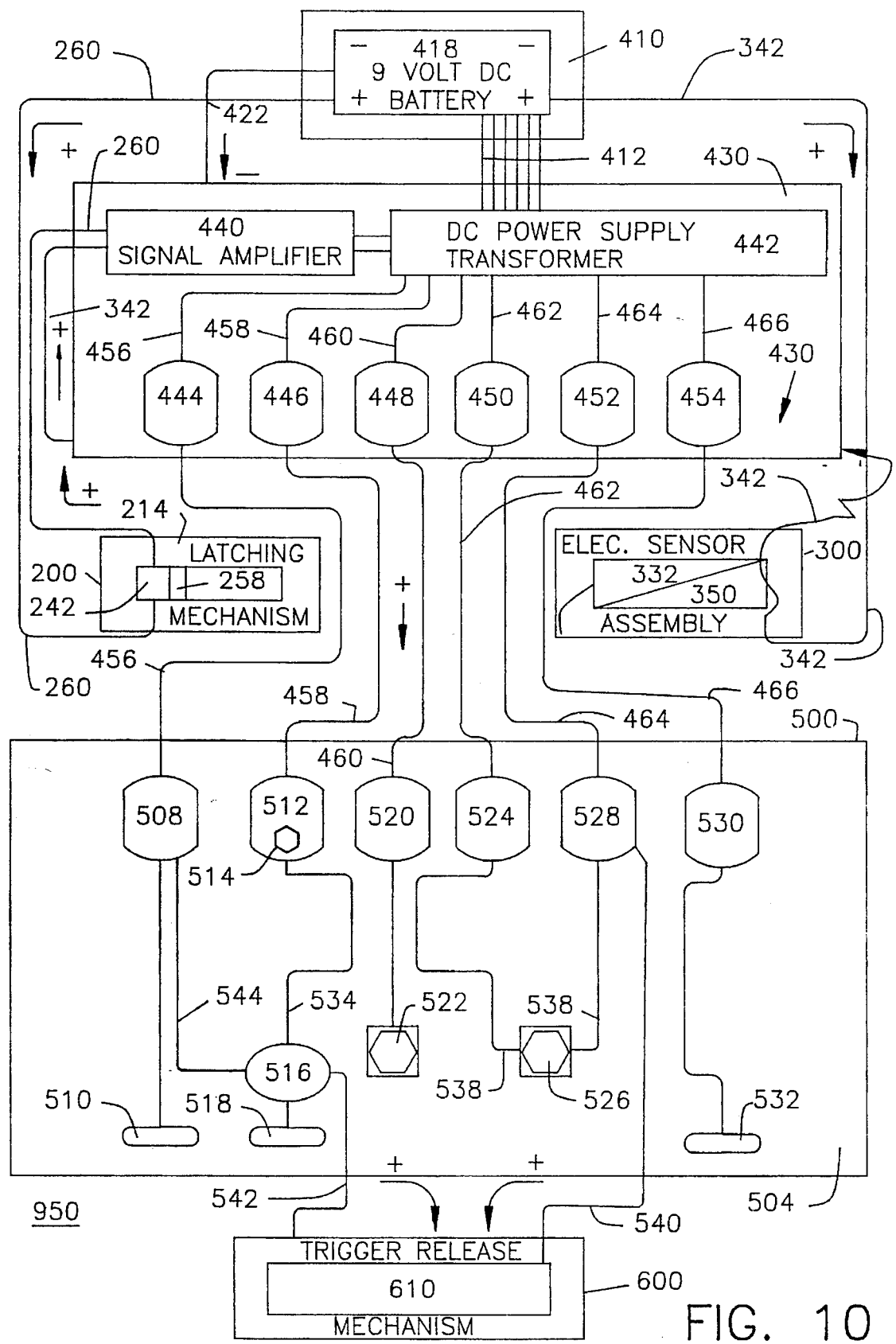
FIG. 10 is a block diagram showing the electronic current flow for the detachable sole, with emphasis on the component parts of the electronic breakaway system.

The electronic control system 400 is shown in FIGS. 1, 4, and 10. As depicted in FIG. 4, the electronic control system 400 includes the power supply 410, which supplies all necessary power requirements for the detachable sole system 110 and is directly connected to the electronic control system 400 via circuit wires 412. Power supply 410 includes a 9-volt D.C. battery 418 and is housed in a rectangular metal housing 414 having an easily removable metal or plastic cover 416 and is located in the arch section of the foot. The housing 414 is molded into the outer face of the upper sole member 120 for easy access in changing the battery 418 when it is depleted. The battery 418 supplies the direct current power needed via circuit wires 412 to the other parts of electronic control system 400. Battery 418 has ground contact points 420 having a ground circuit wire 422 attached to another ground contact point 420, which is attached to the housing wall 402 of the electronic component 430.

As depicted in FIGS. 4 and 10, the electronic control components 430 are responsible for receiving the response signals via system engage sensor circuit wires 260 from the latching mechanisms 200 and for sending out appropriate signals from the solid-state circuit module 436 to the adjustable release mechanism 500 for further transmission.

As depicted in FIGS. 4 and 10, the electronic control system 400 is also responsible for receiving the response signals via wires 342 from the electronic sensor assemblies 300 and for sending out appropriate signals from the solid-state circuit module 436 to the adjustable release mechanism 500 for further transmission. Electronic control components 430 are housed in a rectangular metal housing 432 having an easily removable metal or plastic cover 434. Metal housing 432 is located in the arch section of the foot, and is molded into the outer face of the upper sole member 120 for easy access in changing the entire electronic control (one piece) circuit module 436. The circuit module 436 can be plugged in or out of housing 432 by circuit plug 438 and be easily changed when the system 110 is depressurized. Circuit module 436 has solid-state circuitry comprising an electronic signal amplifier circuit chip 440, a D.C. power supply transformer circuit chip 442, a battery life indicator electronic circuit chip 444, connected to a battery life indicator display 508, an on/off system switch circuit chip 446 connected to a switch 512, an internal adjuster timer electronic circuit chip 448, a release pressure potentiometer electronic circuit chip 450, a threshold level indicator circuit chip 452 (such as a compactor circuit), and a system-engage indicator microprocessor with timer circuit chip 454. The circuit module 436 is responsible for sending out the proper electrical (electronic) signals for activation of the various mechanisms within the detachable sole system 110, in a manner to be explained herein. The electronic circuit module 436 has corresponding circuit wiring for the aforementioned chips, which includes the battery life indicator circuit wires 456, system on/off switch circuit wires 458, an internal adjuster timer circuit wires 460, release pressure potentiometer circuit wires 462, threshold level indicator circuit wires 464, system-engage indicator circuit wires 466, system-engage sensor circuit wires 260, and strain gauge circuit wires 342 transferring the appropriate signal response to the adjustable release mechanism 500.

In operation, as shown in FIGS. 4 and 10, battery 418 is switched on by a clockwise motion of switch 512 using a small metric Allen wrench inserted into hexagonal slot 514 in switch 512. If the battery 418 runs down (90% depletion), the system is shut down by transferring a signal to the battery light indicator display 508 by way of circuit chip 444 of electronic control component 430, then to the system ON indicator 516 via circuit wire 544, and finally to the trigger mechanism 600. This automatically releases the fluid pressure 218 in the main fluid reservoir 716, thereby automatically releasing the lower sole 140 from the upper sole 120.

In operation, as shown in FIGS. 4 and 10, the electronic signal amplifier circuit chip 440 is responsible for amplifying the signal output from the system-engage sensor circuit wires 260 and the electronic sensor strain gauge wire leads 342. The transformer circuit chip 442 is responsible for transforming the 9-volt D.C. power signal input to different millivolt signal outputs sent to the various circuit chips 444, 446, 448, 450, 452, and 454, which then transfers those millivolt signals to the corresponding components of the adjustable release mechanism 500. The electronic control system 400 provides the D.C. power supply 418 directly to the latching mechanisms 200, the electronic sensor assembly 300, and the adjustable release mechanisms 500 for signal activation or deactivation of the detachable sole system 110.

ADJUSTABLE RELEASE MECHANISM 500

Figure 5:
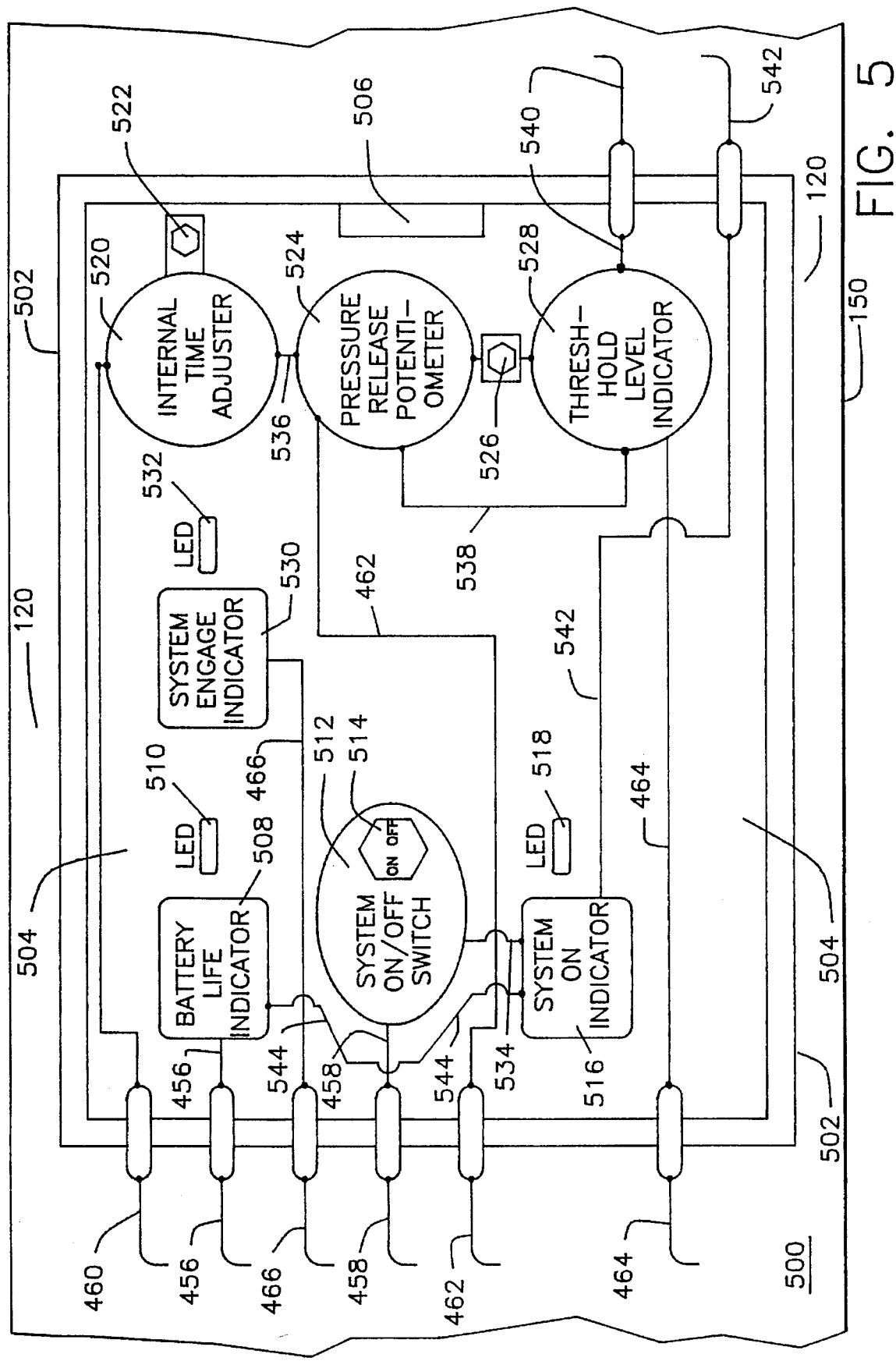
FIG. 5 is a side view of the present invention showing the adjustable release mechanism.

The adjustable release mechanism 500, as shown in FIG. 1, is located in the arch section of the athletic shoe 10, where the housing 502 is molded into the outer side of the upper sole member 120 for visual inspection of the external display module 504. As depicted in FIGS. 5 and 10, the adjustable release mechanism 500 is disposed in a rectangular metal housing 502 and includes an external visual display module 504, which is plugged in or out of housing 502 by circuit plug 506, and can be easily changed when the detachable sole system 110 is depressurized. The visual display module 504 has a solid-state circuitry board for the visual monitoring and manual adjusting of pressure system controls for the detachable sole system 110.

These pressure system controls include a battery life indicator light-emitting diode 508, which shows a blinking red light 510 when the battery has been 90% depleted of power, an on/off system switch 512 with a hexagonal slot 514, a system ON indicator with an LED 516, which shows a green light 518 when the system is on, an internal time adjuster transistor microchronometer 520 with a hexagonal slot 522 for receiving a metric Allen wrench, a release pressure potentiometer device 524 with a hexagonal slot 526 in series with a threshold level indicator 528, and a system-engage indicator with an LED 530, which shows a yellow blinking light 532 when the latching mechanisms 200 are in their fully-engaged position.

The battery life indicator control 508 is directly connected to the battery life indicator circuit chip 444 via circuit wires 456. The battery life indicator control 508 shows a bright blinking red light being emitted from the LED 510 when the 9-volt D.C. battery 418 has been sufficiently depleted of 90% of its power. There is no light emitted from the LED 510 when battery 418 has sufficient power. The ON/OFF system switch control 512 is directly connected to the ON/OFF system switch circuit chip 446 via circuit wires 458. The ON/OFF system switch 512 is responsible for activating the detachable sole system 110 when the slot 514 is turned 180° by a small metric Allen wrench in a clockwise motion, going from the OFF position to the ON position. The switch 512 is turned OFF via slot 514 by the opposite movement of turning the metric Allen wrench 180° in a counterclockwise motion from ON to the OFF position. The system ON indicator 516 is directly connected with the system ON/OFF switch 512 via circuit wire 534. The system ON indicator 516 is activated when the system ON/OFF switch 512 is placed in the ON position, causing LED 518 to become bright green by way of circuit 534, thereby indicating to the athlete that the detachable sole system 110 is activated for the use of athletic shoe 10. When the green light LED 518 is off, this shows the detachable sole system 110 is not activated and is in a non-pressurized state, which indicates that the lower sole member 140 is detached from the upper sole member 120. Battery life indicator 508 is connected to the system ON indicator 516 via circuit wire 544, so when there is a 90% depletion of battery power 418, the trigger mechanism electrical solenoid 610 via circuit wire 542 will release the lower sole member 140 from upper sole member 120.

The internal time adjuster control 520 is directly connected to the internal time circuit chip 448 via circuit wires 460, and control 520 is also directly connected to both the pressure release potentiometer 524 via circuit wire 536, and to the threshold level indicator 528 via circuit wire 538 in series. The internal time adjuster control 520 allows the athlete to pre-set the amount of time interval from a few milliseconds to several milliseconds by turning the hexagonal slot 522 in a clockwise movement with a metric Allen wrench, which increases the Δ delta time interval, and conversely, in a counterclockwise movement, it decreases the Δ delta time interval. The timer hexagonal slot 522 has continuous variable time settings, going from low to high, in a clockwise movement. The pre-set time interval has to be exceeded for the pre-set time and for a pre-set force F (that also was pre-set by the athlete) in order for the release pressure potentiometer control 524 to activate the trigger mechanism 600, in a manner to be explained herein. For example, an athlete may want to increase or decrease the Δ delta time interval for a given force F when the weather conditions on the playing surface have changed, such as from a dry to a muddy (rain) playing field.

The release pressure potentiometer control 524 is directly connected to the release pressure potentiometer circuit chip 450 via circuit wires 462, and control 524 is directly connected to the internal time adjuster control 520 (as previously noted), as well as directly connected to the threshold level indicator 528, which connects to trigger mechanism 600 via circuit wire 540. The release pressure potentiometer control 524, and in conjunction with the threshold level indicator 528, allows the athlete and/or his trainer to pre-set the amount of shear force he can withstand before the lower sole member 140 detaches from the upper sole member 120. The shear force setting can be adjusted to a higher or lower rate by turning a hexagonal slot 526 with a small metric Allen wrench in a clockwise movement for a higher shear force value and counterclockwise for a lower shear force value. The potentiometer hexagonal slot 526 has a continuous variable force setting, going from low to high, in a clockwise movement. The threshold level indicator 528, in series with controls 520 and 524 (as previously noted), is responsible for verifying the pre-set F force and pre-set time interval electronic signals simultaneously, where the indicator control 528 then passed that electronic signal via circuit wire 540 to the external solenoid plunger shaft 616 of trigger mechanism 600. For example, an athlete who weighs 300 pounds may have a higher force setting versus the athlete who weighs 175 pounds, who may have a lower force setting. Once the force setting is pre-set on the potentiometer control 524 in conjunction with threshold control 528 and that force is reached by the athlete, it has to first be exceeded by the Δ delta interval set on control 520 for force F being sustained on surface 350. When those two conditions occur, threshold control 528 sends a signal via circuit wires 540 to trigger mechanism 600 for releasing the lower sole member 140 from the upper sole member 120, in a manner to be explained herein.

TRIGGER RELEASE MECHANISM 600

Figure 6:
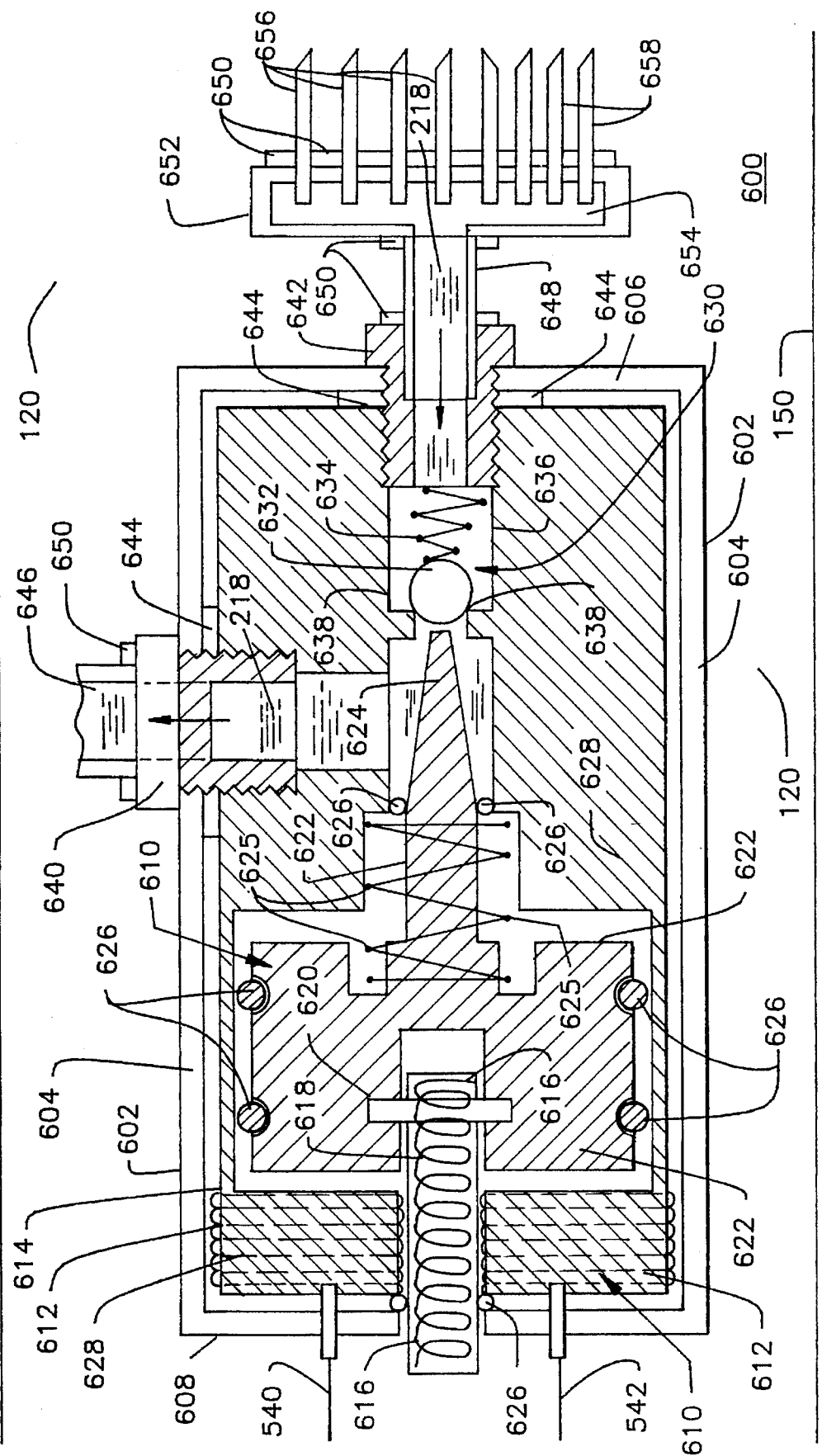
FIG. 6 is a side view of the present invention showing the trigger mechanism.

As shown in FIG. 1, the trigger release mechanism 600 is precisely located in the arch section of the upper sole member 120 of athletic shoe 10. Trigger mechanism 600, as depicted in FIG. 6, is housed in a cylindrical metal housing 602 molded in a horizontal position within the upper sole member 120. The metal cylindrical housing 602 has an outside wall section 604, a right sidewall surface 606, and a left sidewall surface 608.

Contained within the cylindrical metal housing 602, there is an electrical solenoid 610, an internal check ball valve 630, a micro Swegelock fitting 640 for outgoing fluid 218, a micro Swegelock fitting 642 for incoming fluid 218, and an internal solid cylindrical housing 628.

The electrical solenoid 610 includes the following parts: a helix coil of wires 612 wound on internal cylindrical core 614 of internal housing 628, which establishes a magnetic field; an external solenoid plunger 616; a helix coil of wires 618 wound around plunger 616, which establishes a magnetic field; a plunger shaft pin 620, which connects plunger 616 to the internal solid spool plunger 622 having a driving element 624; an internal spool plunger spring 625; and guide O-rings 626.

The internal check valve 630 includes the following parts: a nylon or TEFLON coating check ball 632, check ball return spring 634, and a cylindrical check valve housing 636 for holding and transferring of fluid 218.

Micro Swegelock fittings 640 have leakproof and seal-tight rubber or TEFLON coating gaskets 644 for the prevention of any leakage of fluid 218. Connected to fittings 640 and 642 are fluid transfer lines 646 and 648, respectively, which are permanently attached to the Swegelock fittings 640 and 642 by silver soldering tack 650. Fitting 640 is located on the upper section of the outside wall 604 in housing 602. Fitting 642 is centrally located on cylindrical right sidewall 606 in housing 602.

Connected to the incoming fluid-transfer line 648 is a multi-tube manifold device 652 that further connects to a plurality (up to 22) of fluid outlet tubes 656 and 658 from the latch mechanisms 200 and electronic sensor assemblies 300. The manifold device 652 combines all fluid 218 from fluid outlet tubes 656 and 658 into a single manifold fluid chamber 654. The plurality of outlet tubes 656 and 658 are permanently attached to the manifold device 652 by a silver soldering tack 650.

Electrical connections to the electrical solenoid 610 are made by circuit wire 542, which is responsible for supplying power to the solenoid 610, and by circuit wire 540, which is responsible for activating solenoid 610. Electrical circuit wires 540 and 542 are centrally located through the cylindrical left sidewall 608 in housing 602.

FIG. 6 shows the operation of the trigger release mechanism 600 for actuating the Δ delta pressure change within detachable sole system 110 for releasably holding the lower sole member 140 to the upper sole member 120 of the athletic shoe 10. The trigger release mechanism 600 is connected to the latch mechanisms 200 and electronic sensor assemblies 300 for actuating the release of fluid pressure within those respective fluid chambers 248 and 352 by way of inlet/outlet tubes 250 and 354.

The trigger release mechanism 600 is directly connected to the adjustable release mechanism 400 for electronically actuating (switching ON by switch 512) via circuit wire 542 by way of the electrical solenoid 610, which now is ready for receiving a signal verification when there is an excessive force F in the detachable sole system 110.

The trigger release mechanism 600 is also directly connected to the adjustable release mechanism 500 for signal verification via circuit wire 540, and in response thereto, the latch and electronic sensor piston heads 214 and 314 are retracted into the upper sole member 120. The threshold level indicator 528 verifies the occurrence of the pre-set F force signal and the pre-set delta time interval electronic signal. Simultaneously, indicator 528 then passes that electronic signal via circuit wire 540 to the external solenoid plunger shaft 616. The helix wire coils 612 and 618 are energized, forming a magnetic field, causing external plunger shaft 616 to move inwardly (to the right). Shaft 616, through pin 620, drives internal spool plunger 622 inwardly, compressing the spool plunger spring 625, whereby the plunger driving element 624 moves approximately 1/16" to the right and comes in physical contact with the TEFLON coating check ball 632. The guide O-rings 626 keep the spool plunger 622 with driving element 624 tracked in its proper alignment to the check ball 632.

Driving element 624 moves the check ball 632 to its open position, so that return spring 634 is slightly compressed, and fluid 218 passes through the chamfer abutment opening 638 and flows to the incoming check valve 744 and back into main fluid reservoir 716. As a result of the fluid pressure being released, the latch and electronic piston heads 214 and 314 retract into the upper sole 120 by the force of return springs 220 and 318, respectively.

When the trigger release mechanism 600 is deactivated and the lower sole member 140 has detached, the electrical solenoid 610 is de-energized and the magnetic field turned off. When this occurs, the return spring 634 expands and moves the check ball 632 to the left, where it engages and closes the chamfer abutment opening 638, thereby closing off the flow of fluid 218 to the main fluid reservoir 716. Simultaneously, the driving element 624 of spool plunger 622 moves to the left caused by the expansion of spool plunger spring 625, so that driving element 624 no longer engages check ball 632. This allows check ball 632 to move against the chamfer abutment opening 638 closing the fluid 218 flow to the main fluid reservoir 716.

To reactivate the detachable sole system 110 by aligning of upper and lower sole members 120 and 140, the athlete must activate the manual reset mechanism 800. This moves the latch and electronic sensor piston heads 214 and 314 into the lower sole members 140. This also energizes the electrical solenoid 610 via circuit wire 542 by switch 512, which shows the detachable sole system ON 518. This action ensures the check ball 632 is in the closed position, by having no physical contact with driving element 624, so that the fluid 218 holding piston heads 214 and 314 in their engaged positions remains under pressure.

The trigger release mechanism 600 is a key component in the system, for the detaching of lower sole member 140 from upper sole member 120.

RESERVOIR AND BLADDER SYSTEM 700

Figure 7:
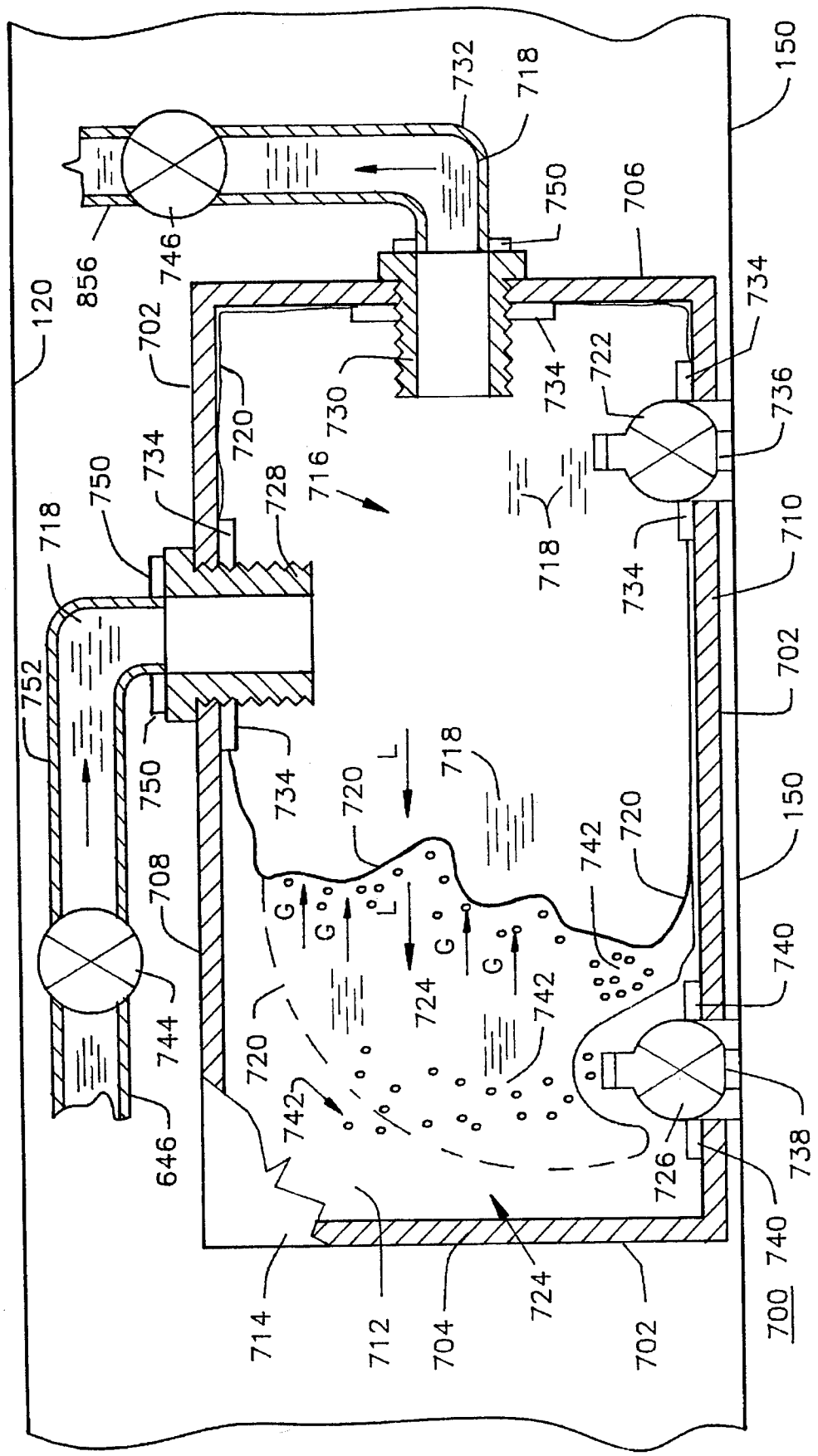
FIG. 7 is a side view of the present invention showing the reservoir and bladder system.

The reservoir and bladder system 700, as shown in FIG. 1, is precisely located in the arch portion of the upper sole member 120 of athletic shoe 10. Reservoir and bladder system 700, as depicted in FIG. 7, is housed in a rectangular metal housing 702, having a left sidewall 704, a right sidewall 706, a top wall member 708, a bottom wall member 710, a rear wall member 712, and a front cover panel 714, located on the bottom surface of upper sole member 120, for easy access to the component parts housed within.

Metal housing 702 is molded in a centrally-located area of the arch section of the upper sole member 120, with a TEFLON coating plastic/metal cover panel 714 being flush with the TEFLON coating slip surface 152 within upper sole member 120. Within housing 702, there is a main fluid reservoir chamber 716, main reservoir fluid 718, an expandable reservoir bladder 720 permanently disposed in chamber 716, a fill liquid microcheck valve 722, an air/gas reservoir chamber section 724, a fill gas microcheck valve 726, a micro Swegelock fitting 728 for incoming reservoir fluid 718 via fluid transfer line 752, and a micro Swegelock fitting 730 for outgoing fluid 718 via fluid transfer line 732.

The expandable bladder 720 may be made of any expandable material which is fluid impermeable, such as rubber, plastic, or other suitable materials. The expandable bladder 720 is permanently bonded by a waterproof glue to portions of walls 706, 708, 710, and 712 and has leakproof and seal-tight rubber or TEFLON coating gaskets 734 enclosing the liquid fill microcheck valve 722 and fittings 728 and 730, thus preventing any leakage of fluid 718 to the outside areas of upper sole member 120.

The fill liquid microcheck valve 722, having a liquid fill receiving port 736, is located on the bottom wall 710. Fill port 736 is flush with cover panel 714 and has a hole therein for the filling of fluid 718 from an outside source. The fluid 718 may consist of any liquid material, such as water, glycol, freon, or other suitable liquid material that would be non-corrosive to the detachable sole system 110, if leaked out by accident. The size of the main reservoir 716 is determined by the volume of fluid 718 required for the latching mechanisms 200, electronic sensor assemblies 300, and the trigger mechanism 600, etc., within upper sole member 120.

The fill gas microcheck valve 726, with a gas fill intake port 738, is located on the left section of bottom wall 710. Check valve 726 has an internal seal, which is a leak-tight rubber or TEFLON coating gasket 740 for the prevention of gas 742 leakage from the gas reservoir section 724. The gas fill intake port 738 is flush with cover panel 714 and has a hole therein for the filling of a pressurized gas 742 from an outside source into the gas reservoir section 724 by the way of microcheck valve 726. The pressurized gas 742 may consist of any gaseous material, such as air, nitrogen, argon, or other suitable gaseous material that would be non-flammable and non-corrosive to the detachable sole system 110, if leaked out by accident.

The reservoir and bladder system 700 has an incoming microcheck valve 744 for liquid fluid 718 flowing from trigger mechanism 600 via transfer fluid line 646.

Fluid 718 flowing from microcheck valve 744, by way of transfer fluid line 752, is permanently attached to the Swegelock fitting 728 by a silver soldering tack 750. An (outgoing) exit microcheck valve 746 for fluid 718 flowing from the main fluid reservoir 716 where fluid 718 is transferred (pumped) via transfer fluid line 856 to the manual reset mechanism 800. Transfer fluid line 732 is permanently attached to the Swegelock fitting 730 by way of silver soldering tack 750.

FIG. 7 shows the operation of the reservoir and bladder system 700 for transferring the main reservoir fluid 718 in and out of the main fluid reservoir chamber 716 when activation of the trigger mechanism 600 or the manual reset mechanism 800 occurs.

In the initial startup of the reservoir and bladder system 700 of athletic shoe 10, an appropriate fluid 718 will be added through the liquid fill intake port 736 and through the fill liquid microcheck valve 722. After passing valve 722, the fluid 718 will enter the main fluid reservoir chamber 716, where fluid 718 is contained within the expandable bladder wall 720. To pressurize the fluid 718 within the expandable bladder wall 720, a pressurized gas 742 is supplied through the gas fill receiving intake port 738 and through the fill gas microcheck valve 726. After passing valve 726, the pressurized gas 742 will enter the gas reservoir chamber section 724. The pressurized gas 742 is contained within chamber 724, and gas 742 exerts a positive pressure against the expandable bladder wall 720, thereby pressurizing the fluid 718 within reservoir chamber 716. The pressurized fluid 718 will remain within reservoir chamber 716 by microcheck valves 744 and 746 being closed when the detachable sole system 110 is not in use.

The liquid and gas intake ports 736 and 738 may also be used for the purging of any excess liquid 718 or gas 742 from their respective chambers 716 and 724. The reservoir and bladder system 700 components within housing 702 are only accessible when the total system has been depressurized by switching OFF switch 514 or by lower sole member 140 being detached.

When the reservoir and bladder system 700 is operating (system indicator 518 is ON), and the athletic shoe 10 is subjected to an excessive shear force F, the trigger mechanism 600 will physically actuate and open the microcheck valve 744 so that the pressurized fluid 218 will flow from trigger mechanism 600 via transfer fluid lines 646 and 752 to the main fluid reservoir chamber 716. The incoming pressurized fluid 718 will cause the expandable reservoir bladder wall 720 to fill up further and move the bladder wall 720 toward the gas reservoir chamber section 724, which will further pressurize the fluid 718 within the main fluid reservoir chamber 716. This allows the fluid 218 in the latching mechanisms 200 and electronic sensors 300 to flow out to chamber 716 and thereby depressurizes latching mechanisms 200, which allows the piston shafts to retract completely into upper sole member 120 and releasing the lower sole member 140. The fluid 718 stops flowing when the latch mechanism and electron sensor assembly piston shafts 212 and 312 are in their retracted positions.

When the athlete wants to reattach the lower sole member 140 to the upper sole member 120, the athlete must use his manual reset mechanism 800, in a manner to be explained herein. In using the reset manual pump 810, it manually actuates the exit microcheck valve 746 to remove fluid 718 from the expandable reservoir bladder 720 by way of fluid transfer lines 732 and 856 to the manual reset fluid chamber 830 for further fluid transfer.

MANUAL RESET MECHANISM 800

Figure 8:
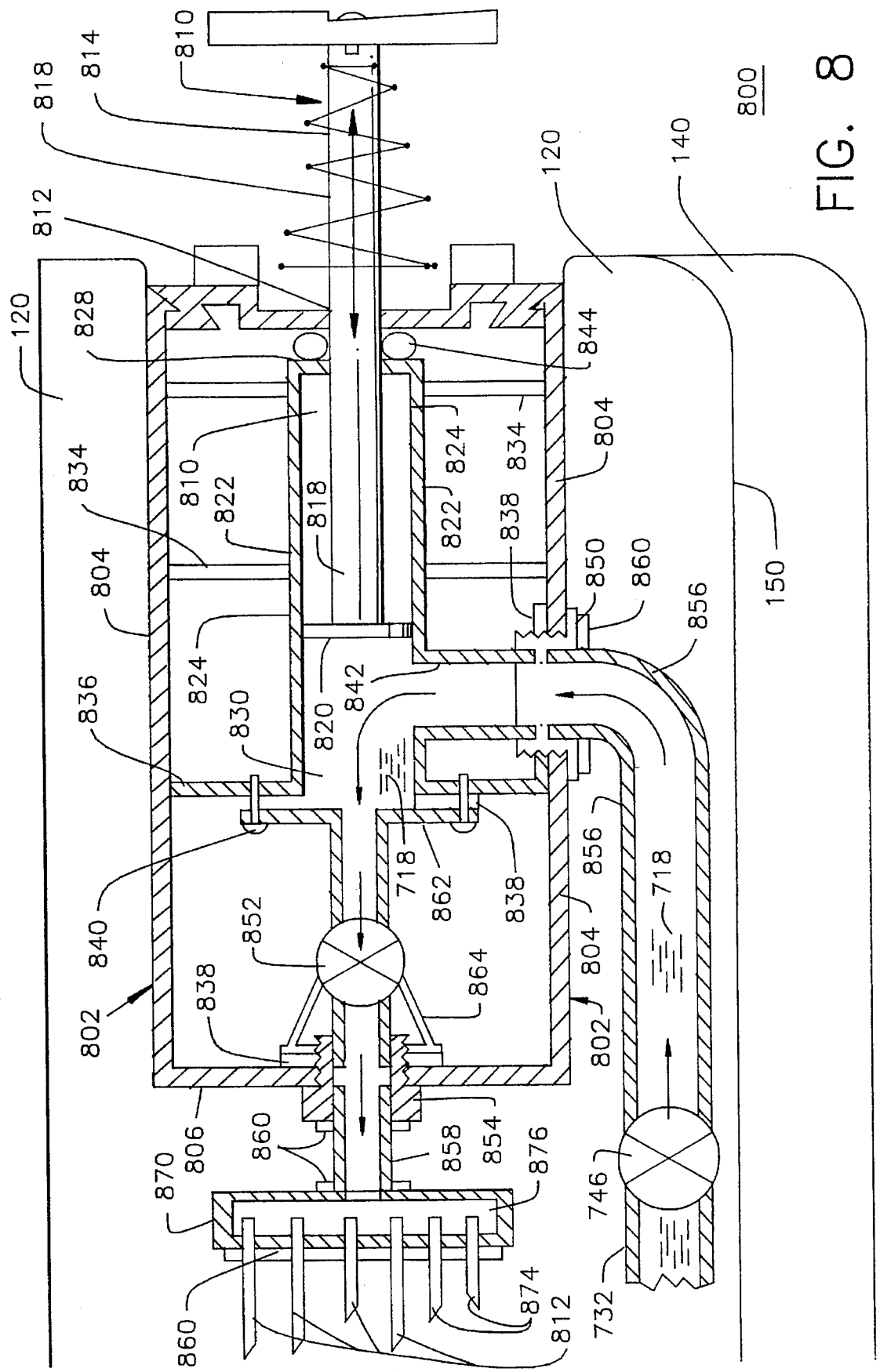
FIG. 8 is a side view of the present invention showing the manual reset component.

As shown in FIG. 1, the manual reset mechanism 800 is located in the center section of the back of the heel within the upper sole member 120 of athletic shoe 10. Manual reset mechanism 800, as depicted in detail in FIG. 8, is housed in a cylindrical metal housing 802 molded in a horizontal position in a center section of the back of the heel within the upper sole member 120. The metal cylindrical housing 802 has an outside wall section 804, a left sidewall surface 806, and a right side plastic cover panel 808 for easy access to the manual pump assembly 810 and the other components housed within. There is a center hole 812 in the removable cover panel 808 in which the manual reset pump plunger 814 is mounted. The pump plunger 814 has a removable handle 816.

To gain access to the interior parts for repairs, if needed, the first step would be to unscrew and remove handle 816 from pump plunger 814. The next step would be to unsnap cover panel 808 from housing 802 and pull cover panel 808 away from pump plunger shaft 818, so that inspection of the manual pump assembly 810 may take place.

The cylindrical metal housing 802 houses manual pump assembly 810, a micro Swegelock fitting 850 for incoming fluid 718, a microcheck valve 852 for outgoing fluid 718, and a micro Swegelock fitting 854 for outgoing fluid 718.

The manual pump assembly 810 includes the following parts: a pump plunger 814 having a removable handle 816; a plunger shaft 818 having a pump header surface 820 disposed at the left end of shaft 818; a hollow cylindrical metal pump housing 822 having an inside wall section 824, a left sidewall 862, and a right sidewall 828, where housing 822 is used for the creation of a vacuum action within the manual reset fluid chamber 830; a pump plunger return biasing spring 832 disposed around plunger shaft 818 and between handle 816 and the exterior of sidewall 808 of pump housing 822; a plurality of support ribs 834 permanently disposed on the outside wall section 824 of housing 822 for maintaining the stability and alignment of the manual pump assembly 810 within the interior section of housing shell 802; a pair of support flanges 836 having a TEFLON coating or rubber gasket 838 with machine screws 840 for mounting purposes; a cylindrical channel opening 842 permanently disposed on the bottom left section of outside wall 824 for receiving of incoming fluid 718; and a manual pump Teflon O-ring 844 for the prevention of leakage of fluid 218 to the outside heel area of the upper sole member 120.

The micro Swegelock fittings 850 and 854 have leakproof and seal-tight rubber or Teflon gaskets 838 for the prevention of any leakage of fluid 718 to the detachable sole system 110. Connected to fittings 850 and 854 are fluid transfer lines 856 and 858 for incoming fluid 718 for outgoing fluid 718, respectively, and they are permanently attached to the Swegelock fittings by a silver soldering tack 860. Fitting 850 is centrally located on the lower section of outside wall 804 in housing 802. Fitting 854 is located centrally on cylindrical left sidewall 806 in housing 802.

Microcheck valve 852 for outgoing fluid 718 is connected to support flanges 836 of housing 822 by way of a connecting flange 862 and is also connected to the left sidewall 806 by way of a support flange 864. Flanges 862 and 864 give support and proper alignment to check valve 852 within housing 802. Microcheck valve 852 directly connects to the micro Swegelock fitting 854, as shown in FIG. 8.

Connected to the outgoing fluid transfer line 858 is a multi-tube manifold device 870 that further connects to a plurality (up to 22) of outlet tubes 872 (20 tubes) and tubes 874 (2 tubes). Tubes 872 and 874 connect to latching mechanisms 200 and electronic sensor assemblies 300, respectively. The manifold device 870 channels fluid 718 from the manifold fluid chamber 876 into the plurality of outlet tubes 872 and 874, which are permanently attached to manifold 870 by silver soldering tacks 860.

FIG. 8 shows the operation of the manual reset mechanism 800 being used for the pressurizing or repressurizing of the detachable sole system 110 for athletic shoe 10. The manual reset mechanism 800 is directly connected to the reservoir and bladder system 700 to supply incoming fluid 718 via transfer fluid line 732 and 856. The manual reset mechanism 800 is also directly connected to the latch mechanisms 200 and electronic sensor assemblies 300 to receive outgoing fluid 718 via transfer fluid line 858 by way of multi-tube manifold device 870. When the lower sole member 140 is ready to be reattached, lower sole member 140 must first be aligned with upper sole member 120. Then, the manual pump assembly 810 is used to extend and engage the latch and electronic sensor piston heads 214 and 314 to their corresponding latch-receiving recesses 238 and tapered-receiving recesses 334, by pumping fluid 718 to those mechanisms 200 and 300 to pressurize them. In the operation of manual pump 810, the plunger handle 816 is released from the cover panel 808, and plunger shaft 818 and handle 816 spring outwardly through hole opening 812. Handle 816 is actuated in an in-and-out pumping motion, whereby the pressurized fluid 718 is caused to flow into the enlarged fluid chamber 830 by a vacuum action. The fluid 718 comes from incoming fluid check valve 746 via transfer fluid lines 732 and 856 by way of channel opening 842. The fluid 718 is then caused to flow through the check valve 852 by the forward movement of plunger shaft 818 and pump header surface 820 in conjunction with the expansion of the return biasing spring 832 to the left. Fluid 718 moves through check valve 852 into multi-tube manifold header 870, where fluid 718 is supplied from the manifold chamber 876 into the plurality of outlet tubes 872 and 874 of the latching fluid chamber 248 and electronic sensor fluid chamber 352, respectively.

Movement of plunger 814 in and out is repeated several times to pressurize the detachable sole system 110, whereby the piston heads 214 and 314 are pressurized and forced to move and engage the lower sole member 140, so that upper and lower sole members 120 and 140 are reattached. When the reattaching of detachable sole system 110 has been completed, the yellow LED 532 is turned on for several seconds only by system engage control 530, which indicates the complete locking of all spring-loaded lock bars 242 of latching mechanisms 200. When this occurs, the athlete can stop the pumping process, secure plunger handle 816 to cover panel 808, whereby athletic shoe 10 is ready for use again.

FLUID FLOW CONTROL SYSTEM 900

Figure 9:
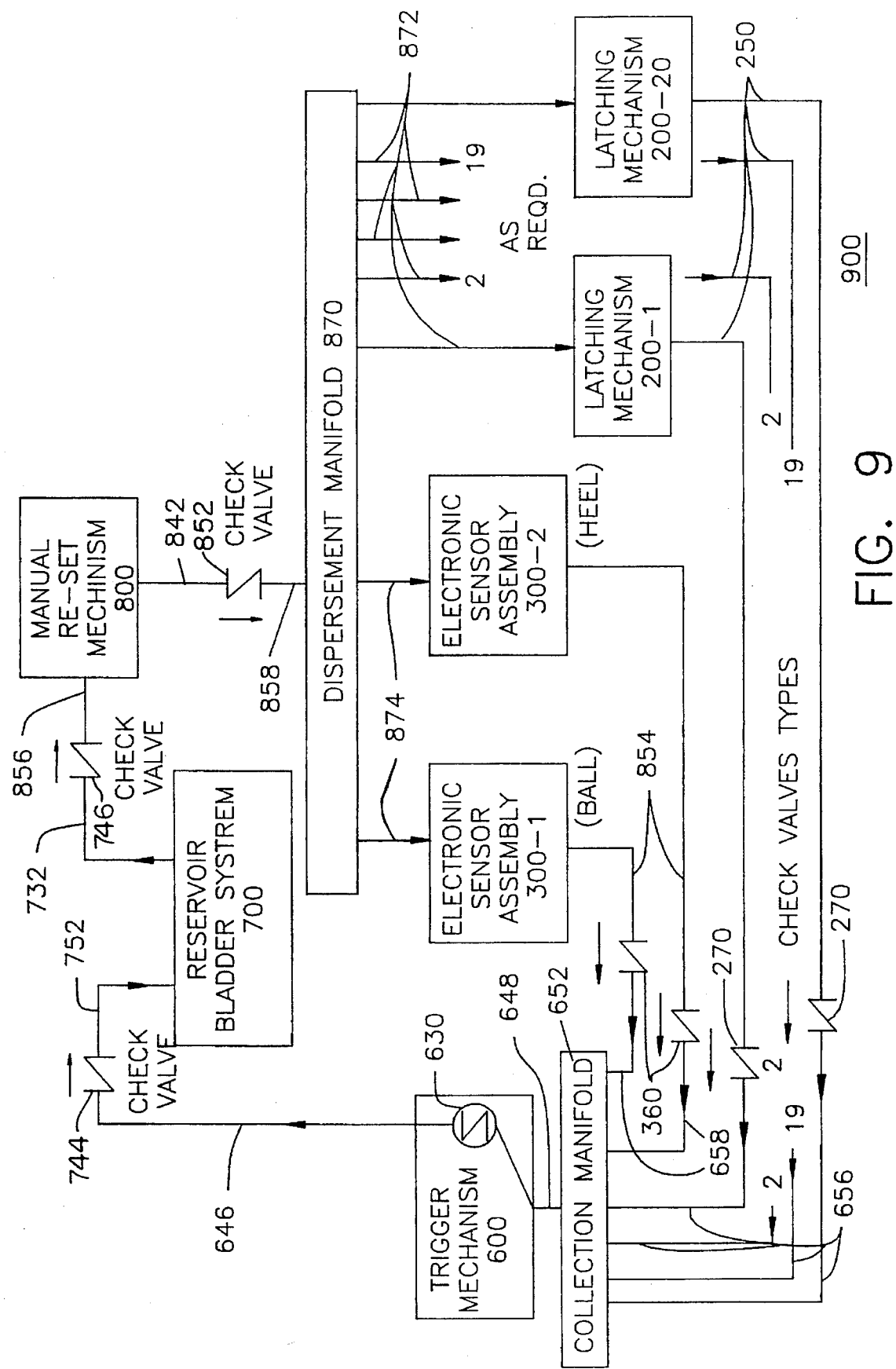
FIG. 9 is a block diagram showing the pneumatic fluid movement within the detachable sole.

FIG. 9 diagrammatically shows the overall fluid flow-control system 900, which includes the following major components: a fluid reservoir and bladder system 700; a manual reset mechanism 800; a dispersement manifold 870; a plurality of latching mechanisms 200; two electronic sensor assemblies 300; a collection manifold 652; and a trigger release mechanism 600.

The fluid reservoir and bladder system 700 is connected to the manual reset mechanism 800 by lines 732 and 856 having a check valve 746. Reservoir and bladder system 700 is also connected to the trigger release mechanism 600 by lines 646 and 752 having a check valve 744. Manual reset mechanism 800 is connected to a multi-tube fluid dispersement manifold 870 via lines 842 and 858 having a check valve 852.

The dispersement manifold 870 is then connected to the latching mechanisms 200 by lines 872, and dispersement manifold 870 is also connected to the electronic sensor assemblies 300 by lines 874. In turn, latching mechanisms 200 are connected to the collection manifold 652 via lines 250 and 656 having check valves 270. There is also a plurality of up to 20 latching mechanisms (18 of which are not shown) that are also connected to the collection manifold 652 via lines 250 and 656 having check valves 270. The two electronic sensor assemblies 300-1 and 300-2 are also connected to the collection manifold 652 via lines 354 and 658 having check valves 360. The collection manifold 652 is connected to the trigger release mechanism 600 via line 648.

When the electronic sensor assemblies 300-1 and 300-2 in the ball of the foot and the heel of the foot, respectively, within the upper sole member 120 and lower sole member 140, sense a shear force that exceeds a predetermined value, the electronic sensors 300-1 and 300-2 send a signal to trigger mechanism 600, which opens an internal check ball valve 630 to release the fluid pressure acting on all of the latch mechanisms, including 200-1 to 200-20 and the electronic sensors 300-1 and 300-2. With the fluid pressure eliminated, all of the latch piston shafts 212 of latch mechanisms 200-1 and 200-2 and sensor piston shafts 312 of electronic sensors 300-1 and 300-2 will be pulled to the retracted position by the biasing springs, thereby releasing the lower sole member 140 from the upper sole member 120.

ELECTRONIC CURRENT FLOW 950

FIG. 10 diagrammatically shows the electronic (electrical) current flow 950 for the detachable sole system 110 of athletic shoe 10. Electrical current flows from the D.C. power supply 410 to the following components: the latching mechanism 200; the electronic sensor assembly 300; the electronic control components 430; the adjustable release mechanism 500; and the trigger release mechanism 600.

The current is supplied by the 9-volt D.C. battery 418 and is connected to the D.C. power supply transformer 442 via circuit lines 412. Battery 418 is also connected directly to the latching mechanism 200 via circuit wires 260 and connected directly to the electronic sensor assembly 300 via circuit wires 342. Battery 418 has a ground circuit wire 422, which is attached to the housing wall 402 of the electronic control component 430.

The D.C. power supply transformer 442 provides current to the following electronic functions: a battery life indicator circuit chip 444 via circuit wire line 456; a system ON/OFF switch circuit chip 446 via circuit wire line 458; an internal time adjuster circuit chip 448 via circuit wire line 460; a potentiometer to adjust pressure release circuit chip 450 via circuit wire line 462; a threshold level indicator circuit chip 452 via circuit wire line 464; and a system-engage indicator circuit chip 454 via circuit wire line 466.

The aforementioned circuit chips 444, 446, 448, 450, 452, and 454 are directly connected to the visual display module 504 of the adjustable release mechanism 500 by the aforementioned circuit wire lines 456, 458, 460, 462, 464, and 466, respectively. Included within the adjustable release mechanism 500 are six electronic-control functions. A battery life indicator control 508 with a red light LED 510, which blinks when 90% of the battery life 418 has been depleted and is connected to the battery life circuit chip 444 via circuit wire line 456. The battery life indicator control 508 is connected to the system ON indicator control 516 via circuit wire 544, which, in turn, is connected to the trigger release electrical solenoid 610 via circuit wire 542 for activating the trigger mechanism 600 when the battery 418 goes dead and the lower sole member 140 detaches from the upper sole member 120 of athletic shoe 10. A system ON/OFF switch control 512 with a hex slot 514 for ON/OFF control of the detachable sole system 110 and is connected to the system ON/OFF switch circuit chip 446 via circuit wire line 458. An internal time adjuster control 520 with a hexagonal slot 522 for controlling the time interval of a given force and is connected to the internal time adjuster circuit chip 448 via circuit wire line 460. A pressure release potentiometer control 524 in series with the threshold level indicator control 528 having a common hexagonal slot 526 for controlling the force setting via circuit wire lines 538. The controls 524 and 528 are directly connected to their respective circuit chips 450 and 452 by circuit wire lines 462 and 464 and a system-engage indicator control 530 with a yellow light LED 532, which blinks for several seconds when all of the latching piston heads 214 have been securely locked by locking bars 242 in their engaged position within the lower sole member 140. The system-engage indicator control 530 is directly connected with the system-engage indicator microprocessing circuit chip 454 via circuit wire line 466.

A system ON indicator 516 with a green light LED 518 is directly connected to the system ON/OFF switch 512 via circuit wire line 534. The system ON indicator 516 shows that detachable sole system 110 has been turned on by the displaying of a constant green light 518.

The latching mechanism 200 is directly connected to battery 418 via circuit wire line 260. The 9-volt D.C. battery 418 supplies the power for the electronic signal being sent from the system engage sensor contact point 258 via circuit wire line 260 to the signal amplifier 440. The electronic signal from sensor contact point 258 is then amplified and sent through the transformer 442 where the electronic signal from sensor contact point 258 is then received by the system-engage microprocessing circuit chip 454. The system-engage microprocessor 454 verifies the electronic signal from sensor contact point 258 that piston head 214 is locked in place and passes the electronic signal from sensor contact point 258 to the system-engage indicator control 530. The system-engage indicator control 530 and light LED 532 will blink yellow for several seconds and then go off. This will show the wearer of athletic shoe 10 the lower sole member 140 is fully engaged to the upper sole member 120.

The electronic sensor assemblies 300 are directly connected to battery 418 via circuit wire line 342. The 9-volt D.C. battery 418 supplies the power for the electronic signal being sent from the contact surface areas 332 and 350 of electronic sensor assemblies 300 via circuit wire lines 348 and 342. Surface contact area 350 constantly monitors forces F from the surface area 332 and then transmits the electronic signal via circuit wire lines 348 and 342 to signal amplifier 440. The electronic signals from contact points 332/350 are then amplified and sent through the transformer 442 where the electronic signal is then received concurrently by the internal time adjuster 448, pressure-release potentiometer 450, and the threshold level indicator 452 microprocessing circuit chips. The aforementioned circuitry chips 448, 450, and 452 verify the electronic signal for length of time duration for a given force F and the force F attained, which then passes those electronic signals simultaneously to the corresponding controls 520, 524, and 528, which are connected in a series, as shown in FIG. 10. This electronic signal is passed to the trigger release mechanism 600 from the threshold level indicator 528 via circuit wire line 540 when the preset time level in 520 and the preset force in 524 have both been exceeded.

The trigger release mechanism 600 receives the electronic signal by way of the electrical solenoid 610 via circuit wire line 540, which releases the fluid 218 from the latching mechanisms 200 and the electronic sensor assemblies 300 to cause detaching of lower sole member 140 from the upper sole member 120. Also, connected to the trigger release mechanism 600 is the system ON indicator 516 via circuit wire line 542. The system ON indicator 516 sends an electronic signal, which activates the electrical solenoid 610 to the reset position where the trigger mechanism 600 is in its standby mode. The trigger mechanism 600 is ready to be activated (triggered) again from the threshold level indicator 528 via circuit wire line 540, which then releases the fluid 218 from the latching mechanisms 200 and electronic sensor assemblies 300 to cause detaching of the lower sole member 140 from the upper sole member 120 when a preset $\Delta$ time interval and force value had been reached.

OPERATION OF THE PRESENT INVENTION

When the athlete is using the footwear of the present invention, prior preparation is needed for the athletic shoe 10 to function properly, which can be done by the athlete himself or done by the athletic trainer, after they have been trained in the proper operating procedure and how to work the necessary settings. Such preparation includes the switching ON of switch 512 to activate trigger release mechanism 600, the checking of battery life 510, and the setting of the time adjuster, pressure release potentiometer and threshold level controls 520, 524, and 528 for a pressure release of the lower sole member 140. The threshold level indicator control 528 constantly analyzes the electronic signals sent through the time adjuster 520 and pressure release potentiometer 528 for a signal which would trigger the trigger release mechanism. The settings for a proper release pressure is dependent upon the athlete's weight and size, the athleticism of that individual, and the maneuverability needed for playing of that sport. Such preparation can be done while the athlete is wearing or not wearing athletic shoe 10. After this preparation is completed, the athlete can then insert his foot in the athletic shoe 10 and secure it by lacing, strapping, and tightening the fastening means securely. "The fastening means may be laces, straps, buckles, clasps, or hook and loop fasteners such as VELCRO." This gives the ankle and foot a snug fit in which there is no adverse pinching or pressure to the foot area.

When the athlete is using the athletic shoe 10 for the first time, both the athlete and/or his trainer must make some initial settings for the internal time adjuster 520, and the pressure release 524. These two settings automatically set the threshold limit of the threshold indicator 528. This threshold limit is based solely upon that particular athlete's personal criteria previously mentioned. The athlete proceeds to practice with athletic shoe 10 on the playing surface to see how the detachable sole system 110 reacts to various stresses. The athlete himself and/or his trainer can then make on-field adjustments to the control hex slots 522 and 526 using a metric Allen wrench, decreasing or increasing the time interval and force value F needed by the athlete for the playing conditions wanted. The above step may take several adjustments to get the detachable sole system 110 fine tuned for the athlete's playing use.

In the course of a playing action of a given sport (i.e., a sharp turn), a high torque/shear force incident can occur to the sole or plurality of cleats 160 of the wearer of athletic shoe 10. The electronic sensor assembly 300 continuously senses all of the shear forces being applied and sends the signals to the electronic-control assembly 400. The electronic control 400 then sends these electronic signals to the adjustable-release mechanism 500. If the shear force of that incident has exceeded the pre-set $\Delta$ time interval and stress force level F for the athlete, the trigger release mechanism 600 is activated to push the electrical solenoid plunger shaft 616 against the check ball 632 away from the abutment 638 to release fluid 218 that eliminates the pressure on all latching mechanisms 200 and electronic sensors 300. Two conditions must occur for before the trigger release mechanism 600 is activated. First, if the pre-set Δ time interval is not exceeded, no signal is sent to the pressure-release control 524, and the trigger release mechanism 600 is not activated. However, when both the pre-set Δ time interval is exceeded and the pre-set shear force F is exceeded, the simultaneous occurrence of both of these conditions will then cause electronic signals to be sent from the internal time adjuster 520 to the pressure release potentiometer 524 and then to the threshold level indicator. As a result of the threshold limit being reached, an electronic signal is sent via circuit wire 540 to the trigger release mechanism 600, which will result in the detachment of the lower sole member 140 from the upper sole member 120 of athletic shoe 10.

More particularly, the trigger mechanism 600 then signals the electrical solenoid 610 to activate the plunger shaft 616 which pushes away the check ball 632 from the abutment edge 638 to allow fluid 218 to flow, which then releases fluid 218 that eliminates pressure on all of the latch mechanisms 200 and electronic sensor assemblies 300. Thus, with the fluid pressure eliminated, the latch mechanisms 200 and electronic sensor assemblies 300 are pulled to the retracted position by biasing springs 220 and 318, thereby releasing the lower sole member 140 from the upper sole member 120 of the shoe instantaneously during the occurrence of that playing action. This immediate detachment of the lower sole member 140 has most likely prevented a serious injury to the hip, leg, knee, ankle, or foot of the athlete using the athletic shoe 10. The athlete then realigns and attaches the lower sole member 140 to upper sole member 120 and is ready for play.

The athlete also has the option of readjusting the pre-set shear force, if needed, by increasing or decreasing the settings of the control hexagonal slots 522 and 526 or by reattaching the sole system 110 as is. The latch mechanisms 200 and electronic sensor assembly 300 are then brought back to their extended positions for rejoining the upper and lower sole members 120 and 140 of the detachable sole system 110. To do this, the athlete operates a manual pump assembly 810 on the shoe, which then provides the repressurizing of the fluid system 700. This enables the upper and lower sole members to be realigned and pumped up again and reattached within seconds, and the athletic shoe 10 can then be used again for further play by the athlete.

APPLICABILITY OF THE PRESENT PRESENT INVENTION FOR OTHER USES

The flexibility of the concept of the present invention for other uses to provide a detachable breakaway system are varied and multipurpose.

1. The detachable breakaway system can be used for road signs, traffic lights, and utility poles where the pole member and the upper base support detaches and breaks away from the lower base support. When an impact to the pole member has occurred, the detachable breakaway system allows the pole member not to be extensively damaged by the impact. The detachable breakaway system would be substituted for the bolts that presently hold the pole member to the base support. In particular, the latch mechanism 200 would replace the bolts used in holding the pole member upright to a lower base support member. In this application, the pole member having an upper base support would detachably release from a lower base support upon impact to the pole. Preferably, the lower base support would be used as the main housing for the major component parts for the detachable breakaway system along with either an A.C. or D.C. power supply. Or conversely, the detachable breakaway system could also be lodged in the upper base support member. The electronic sensor assemblies 300 could be strategically located anywhere along the lower portion of the pole member, or the upper base support area, or even along the lower base support area for sensing of the excessive force/impact to the pole by a vehicle. This would allow for the use of light and less costly construction materials where the pole member and upper base support could sustain multiple impacts without having to replace the pole member and upper base support components as frequently.

2. The detachable breakaway system can be used for military aircraft seats where the body of the aircraft seat detaches itself from its fixed position upon an excessive force impact. It is clear to ascertain the breakaway system for military aircraft, whereas upon an excessive impact, the aircraft seat can detach itself from a lower base plate, and the pilot with the upper seat assembly would be ejected from the aircraft. For civilian and/or military aircraft, the breakaway system could be used for doors and wings containing aviation fuel. When an aircraft crash does occur, the doors could pop open instantaneously: providing an immediate escape route from the crashed aircraft, whereas the wings containing the aviation fuel can detach itself upon impact, thereby greatly reducing the possibility of an explosion and/or fire from spilled aviation fuel.

2A. In using the detachable breakaway system for military fighter aircraft, an example of excessive force would be an explosion, where an aircraft engaged in aerial combat were to be hit by a missile. The resulting explosion would put excessive pressure on the seat base, causing an immediate pilot ejection from the aircraft. In particular, the latching mechanism 200 and electronic sensor assembly 300 would be located in the lower seat base member and would detachably release from an upper seat-pad plate, whereby the pilot sitting in that upper seat pad would then be ejected from the fighter aircraft upon an explosion impact to that fighter aircraft. The other components of the detachable breakaway system, such as the electronic control 400, adjustable release mechanism 500, the trigger release mechanism 600, the reservoir and bladder system 700, and an automated reset mechanism would be housed in the lower seat base member. The latching mechanisms 200 and the electronic sensors 300 would retract into the lower seat base member upon an excessive force impact and would then release the upper the seat-pad plate and allow the pilot with the seat pad to eject to safety.

2B. In civilian aircraft, the detachable breakaway system would find use in providing a method of escaping the aircraft during a crash landing. In particular, the detachable breakaway system would be substituting the hinge part within the aircraft passenger doors, where the latch mechanisms 200 had replaced the screws holding the door hinge to the aircraft frame. In operation, the adjustable-release mechanism 500 receives a signal from the electronic sensor assemblies 300 (located at strategically-placed positions within the aircraft) via the electronic-control assembly 400 where the electronic signal is sent to the trigger release mechanism 600, if a threshold force level had been exceeded. The trigger release mechanism 600 would then have the latching mechanisms 200 retract into the door frame of the aircraft, which would detachably release the aircraft door (it would pop outwardly and away from the aircraft) providing an opened door exit and a viable escape route away from the crashed aircraft. This action is accomplished when the electronic sensor assemblies 300 signal, having exceeded the pre-set shear force level, is then sent to the trigger release mechanism 600, which would activate the electrical solenoid plunger 622 to push the check ball 632 away from the chamfer abutment edge 638, which then releases the fluid pressure on the latching mechanisms 200 and electronic sensor assemblies 300. This simultaneous action would then detachably release the door hinges, making the aircraft doors pop open and fall off towards the ground. The other components of the breakaway system, with the exception of the electronic sensor assemblies 300, could be housed in the aircraft cockpit or in another centrally-located panel position or individually housed in each exit door. The electronic sensor assemblies 300 can be located throughout the aircraft fuselage and/or multiple sensors within given strategic areas that are sensitive points to where crashes are most likely to occur.

2C. For civilian and military aircraft that have wings that are bolted to the main fuselage, the detachable breakaway system may be a life-saving device. In most aircraft, the wings either house the main fuel tanks or carry them externally. In an emergency landing and/or crash landing, these aviation fuel tanks frequently explode and engulf the aircraft in flames with a great loss of lives usually involved. More particularly, the detachable breakaway system would be used to replace the bolts that fasten the wings to the main fuselage, where the latching mechanisms 200 and the electronic sensor assemblies 300 can be located in the main fuselage body adjacent to the wings. When the pre-set shear force had been exceeded due to a crash, the same aforementioned procedural steps occur in the breakaway system, whereby the latching mechanisms 200 and electronic sensor assemblies 300 retract into the main fuselage body and the wings detach from the fuselage. The other components of the breakaway system could be housed in the aircraft cockpit or in another centrally-located panel position or in close proximity to each of the wing assemblies. With this breakaway system for aircraft wings, in a properly functioning mode, the wings would separate in a timely manner, leaving some distance between where the wings ultimately land and the fuselage body had come to rest. This distance could possibly save many lives, as the explosion of the aviation fuel tanks may have only a minimal effect to the main fuselage body.

3. The detachable latch mechanism configuration is also applicable to releasably attaching the expendable fuel tanks and solid rocket boosters (SRB) to the spacecraft. The latching mechanism of the breakaway system would detachably release the solid rocket boosters from the spacecraft when the SRB's are empty. The spacecraft can be programmed such when the last amount of fuel is spent, the SRB's instantaneously release. This provides the spacecraft a minimum amount of weight, when the spacecraft is trying to break out of the earth's gravitational force and go into orbit.

More particularly, the detachable breakaway system would replace the bolting system (bolts explode off the main body of the spacecraft) which holds the expendable fuel and solid rocket boosters to the main body of the spacecraft. The latching mechanisms 200 and electronic sensor assemblies 300 would replace the bolts that hold the fuel tanks and SRB's to the spacecraft. In operation, the electronic sensor assemblies 300 would sense when the rocket fuel was totally consumed and would then send a signal to the electronic-control assembly 400, and then to the adjustable control mechanism 500, and then send a final signal to the trigger release mechanism 600. The trigger release mechanism 600 actuates the retraction of the plurality of latching mechanisms 200 and electronic sensors assemblies 300 into the main body of the spacecraft, so the fuel tanks and SRB's fall away from the spacecraft and parachute safely back to earth with little or no damage. This would allow for many in-flight detachments with minimal structural damage to the SRB's.

4A. The detachable breakaway system can be used for conveyor belt systems, escalator systems, and/or movable sidewalks or movable walkways, fans, or with any device having a pulley system as part of their components, where the aforementioned pulley system would stop driving the apparatus, when a person's extremities and/or physical object gets caught, entangled, or stuck in the conveyance portion of an escalator, movable walkway, or conveyor belt system. More particularly, the detachable breakaway system would be used to replace standard electrical or electronic circuit breakers to stop the apparatus. The electronic sensor assembly would sense the extra pressure and/or impedance to its normal traveling speed, which would cause the latching mechanisms 200 and electronic sensor assembly 300 to retract and have the pulleys free spinning, thereby causing the conveyance belt to stop immediately. The uniqueness to this particular adaptation is the placement of the latching mechanisms 200 and electronic sensor assemblies 300 at the pulley site.

Figure 11:
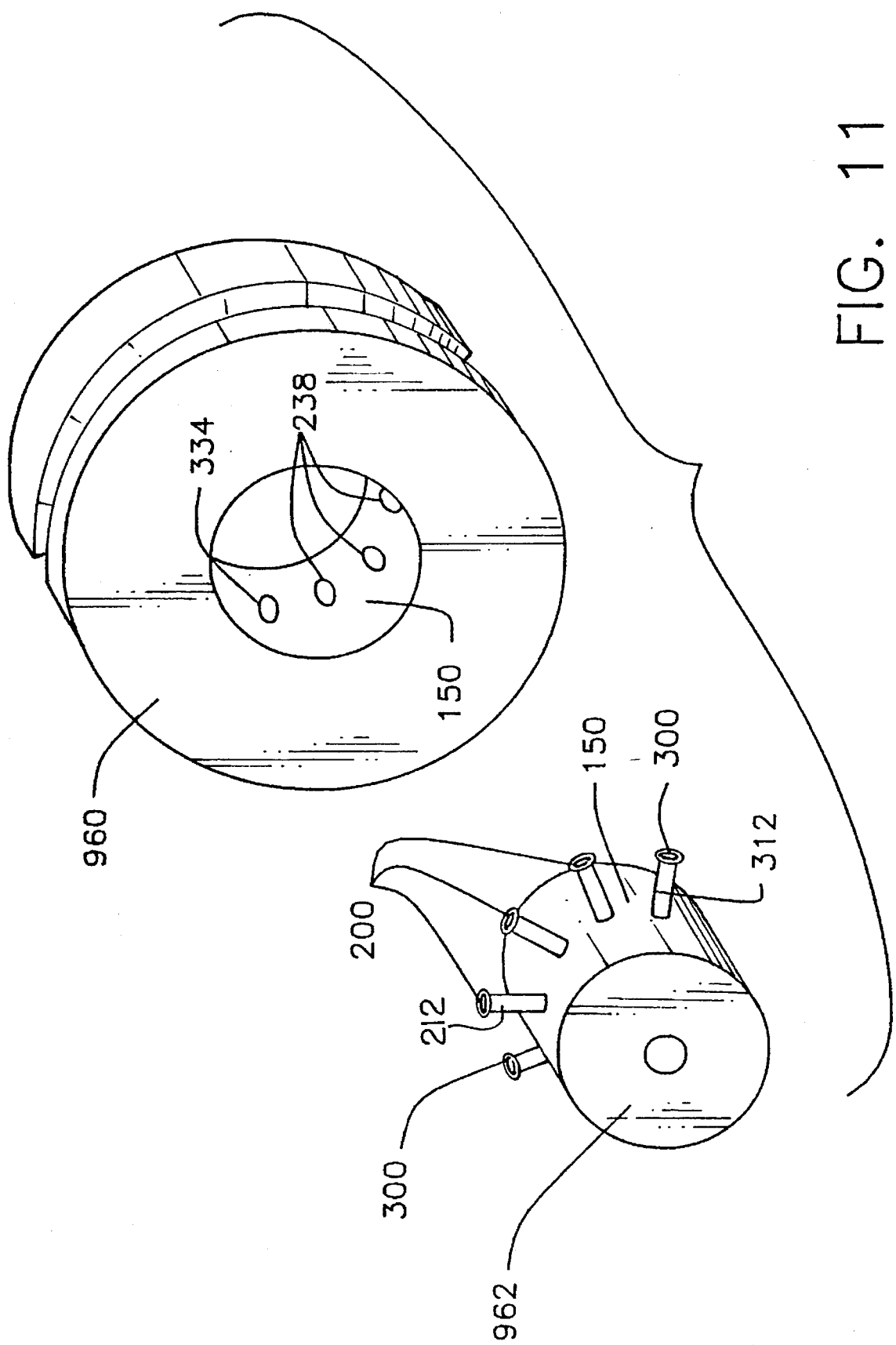
FIG. 11 is an exploded perspective view of a pulley device using the detachable breakaway system showing the inner and outer components.

As shown in FIG. 11, the pulley has an outer pulley wheel 960 and an inner pulley core 962 where the latching mechanisms 200 and electronic sensor assembly 300 would be located in the inner pulley core 962, and the latching piston shaft 212 and the electronic sensor piston shaft 312 protrude outwardly (much like a bicycle wheel with spokes), and the aforementioned shafts are engaged in the outer pulley wheel. In the retracted position, the latching mechanisms 200 and the electronic sensor assembly 300 are totally embedded within the inner pulley core, which allows the inner pulley core to spin freely while the outer pulley wheel is motionless.

Figure 12A:
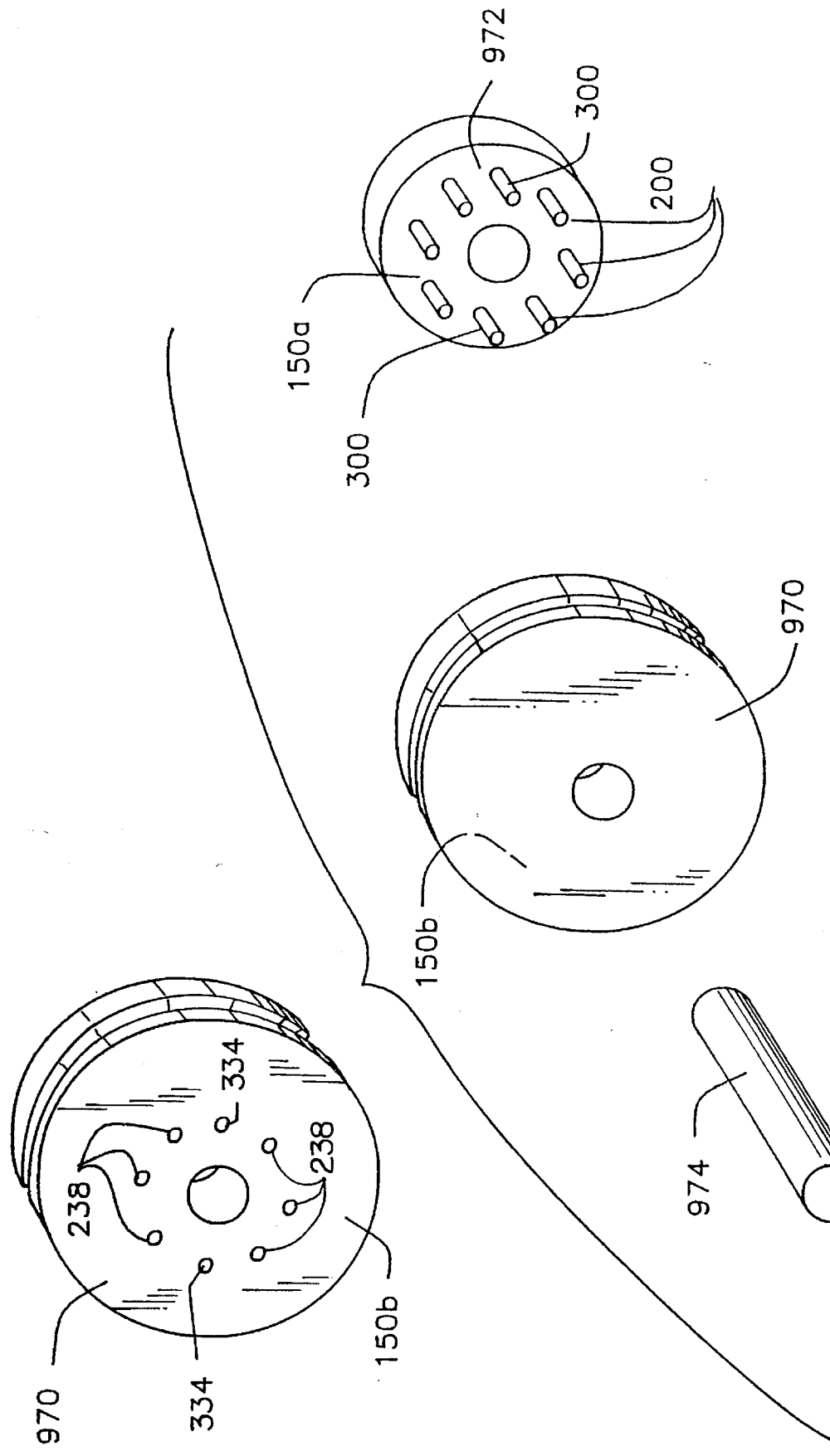
FIG. 12A is an exploded perspective view of a pulley device using the detachable breakaway system showing an outer pulley wheel and an inner wheel control plate.
Figure 12B:
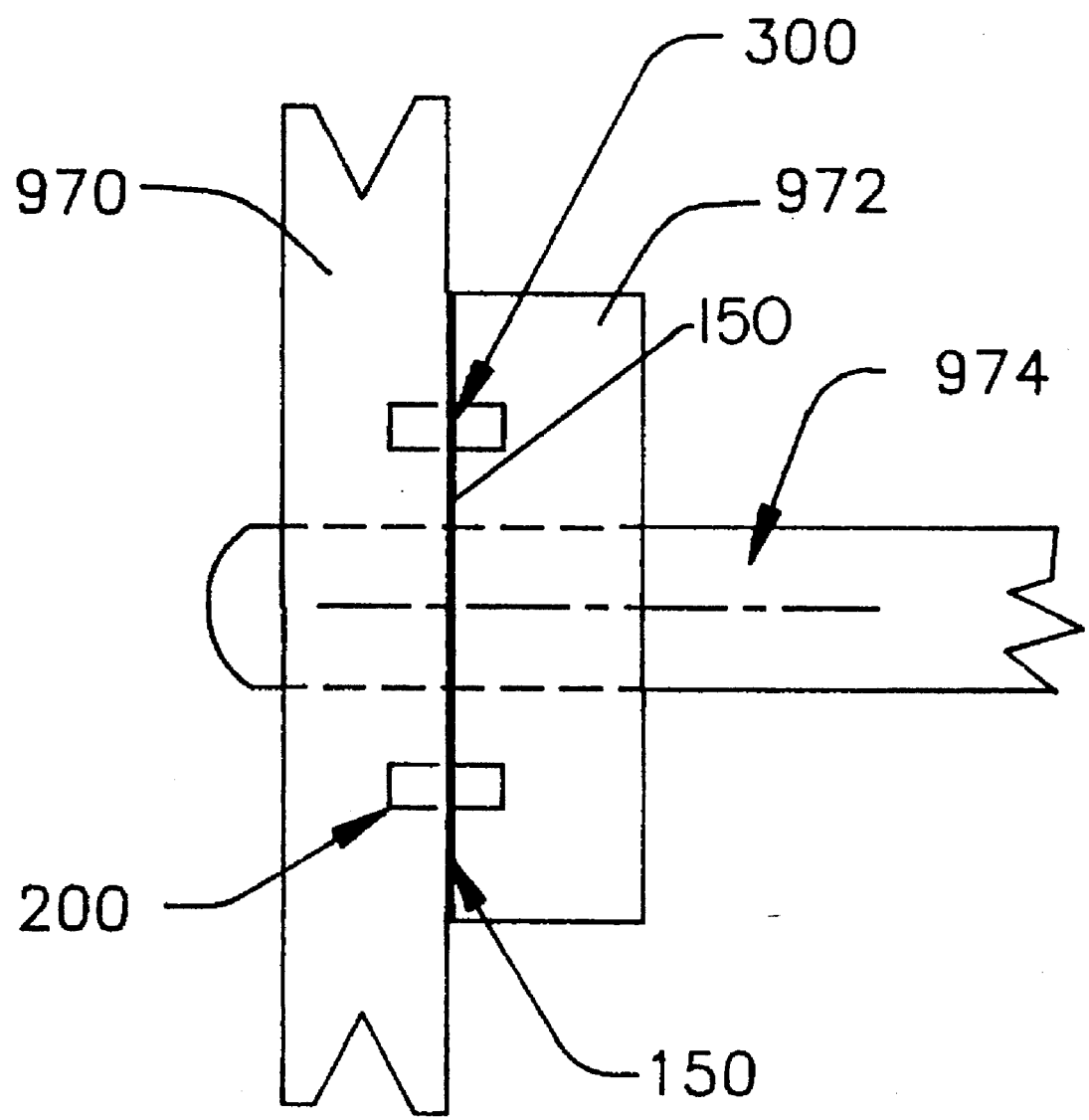
FIG. 12B is a side view of the pulley device shown in FIG. 12A.

In another arrangement, as shown in FIGS. 12A and 12B, the pulley device has an outer pulley wheel 970 and an inner wheel control plate 972, where the latching mechanisms 200 and electronic sensor assembly 300 would be located on the inner surface 150a of the inner wheel control plate 972 (much like the clutch plate gear used in a car). Mechanisms 200 and 300 would protrude outwardly from the surface 150 and into the surface of outer pulley wheel when in the engaged mode. In the retracted position, the latching mechanisms 200 and the electronic sensor assembly 300 are totally within the inner wheel control plate, which allows the outer pulley wheel to stay motionless on a free-spinning pulley shaft 974 and the inner wheel control plate 972 to spin freely.

In both of the above arrangements, the electronic sensor assemblies 300 can be located within the pulley device and/or along strategic locations where one's extremity may lodge in an opening along the course of the conveyance belt. The other components of the breakaway system can be housed in the control panel of the aforementioned apparatus or housed adjacent to the pulley system via connecting tubes, which would carry the pressurized fluid flow and electronic signals to the latching mechanisms 200 and electronic sensor assemblies 300 within the pulley device. In using either arrangement, this type of pulley system would prevent any excessive damage to the motor mechanisms, motor shaft, etc., or injury to the persons using that apparatus.

4B. The detachable breakaway system can be used for any high RPM electromechanical device, such as a lawn mower, snow blower, wood chipper, chain saw, circular saw, and the like, where the aforementioned devices will instantly stop, when a physical object, such as a rock or piece of metal, gets stuck, caught, or entangled in the high-rotary component of the high RPM electromechanical device. The electronic sensor assembly could sense the impedance to its high RPM's rotation, which would cause the latching mechanism and electronic sensor assembly to retract and release the outer pulley section (as previously mentioned in the 4A adaptations), causing the high RPM rotary component to immediately stop. This would prevent any excessive damage to the motor, motor shaft, and motor shaft alignment to the device and could become a standard safety feature for such electromechanical devices.

5. The detachable breakaway system can be used for any kind of goal post in sporting events, such as football, lacrosse, soccer, and hockey, or even a basketball backboard and rim apparatus, where the goal post supports would detachably release from its base support(s). When an excessive impact to goal post support(s) has occurred, the detachable breakaway system allows the goal post not to be extensively damaged from the impact or any serious injury to the person who had hit it. This would allow for the use of light construction materials where the goal posts could withstand many impacts without sustaining any major damage to them and be reused each time.

More particularly, the detachable breakaway system would replace the bolts that hold the goal post support(s) in their upright position on the playing field or even if the goal post support was just buried into the ground. The present invention would have a goal post support located within an upper base member and attached thereof to a lower base member. The lower base member would have all of the component parts, and the upper base member and goal post supports would have strategically-placed electronic sensors thereon, to sense any excessive impact to the goal post structure. The same mechanism principles as previously mentioned in Example 1 would apply to this type of apparatus.

6. The detachable breakaway can be used for sailboat masts where the mast would detachably release from its base support. It could be used when the mast having sails in a large sailboat gets caught in a sudden storm that may have wind gusts greater than 40 mph. When this excessive wind applies stress to the mast, the electronic sensor assembly would sense the excessive force to the sail and mast, which would cause the latching mechanism and electronic sensor assembly to retract and release the mast from its base support. This would be a vital safety feature to sailboats, as the sailboat would not be overturned and/or sunk. The only inconvenience is reattaching the mast to its base support when the sailboat gets back to port. The detachable breakaway system would replace the bolting system used to hold the mast structure in an upright position within the center area of the sailboat. The same mechanism as previously mentioned in Example 1 would apply to this type of sailing mast apparatus.

7. The detachable breakaway system can be used for construction cranes where a series of force sensing devices are attached to the crane's arm and for sensing an excessive force, such as a heavy object exceeded the predetermined force limits of the crane. The pulley system in the crane would detach itself and would let the heavy object down at a slow rate of descent, thereby saving the construction crane from structural damage, saving the object that was being lifted from damage and possibly the construction crew from injury.

More particularly, the detachable breakaway system would be used to replace charts, graphs, and operator error in preventing the crane apparatus from toppling, or having structural failure due to overloading the crane in operation. The same mechanism principles as previously mentioned in Example 4A would apply to the crane pulley system, except for a slight modification. When the latching mechanisms 200 and the electronic sensor assemblies 300 are retracted to the inner core, the pulley wheel would not be completely free wheeling. This is a safety measure to insure no one in the area would be injured. This slow descent would be accomplished by having a very tight fit between the inner and outer cores of the pulley system, which would prevent a fast free fall.

ADVANTAGES OF THE PRESENT INVENTION

The primary advantage of the present invention is that the athletic shoe 10 has a means of a detachable sole system 110, where the lower sole member 140, with or without cleats 160, separates instantaneously from the upper sole member 120 by the use of an electronic sensory assembly 300, thereby substantially reducing the occurrence of hip, leg, knee, ankle, and foot injuries to the wearer.

Another advantage of the present invention is in using a series of latching mechanisms 200 for releasably holding the lower sole member 140 to the upper sole member 120 of the athletic shoe 10. The latching mechanisms 200 have the capability of positively insuring instantaneous release of the upper and lower sole members 120 and 140.

Another advantage of the present invention is by using an electronic sensing system 300 for measuring the shear force with an electronic strain gauge, where the athlete can determine what that shear force should be, thereby initiating a detachment of the upper and lower sole member 120 and 140 in response to a pre-set level of shear force being reached.

Another advantage of the present invention is that the detachable sole system 110 is reusable, wherein once the lower sole member 140 breaks away from the upper sole member 120, it can be reattached to the upper sole member 120. It can be reattached easily by using the manual pump mechanism 800 located in the upper sole member 120 of the athletic shoe 10, thereby giving the athlete the use of his athletic shoe 10 again within a few seconds or very short amount of time of lower sole 140 detachment.

Another advantage of the present invention is in using various interchangeable lower sole members 140 for athletic shoe 10, which would eliminate the need for purchasing many different styles of athletic shoes. This would take into account the individual athlete (weight, size, athleticism), the different playing surfaces and weather conditions of being hot and sunny, muddy, rainy, snowy, and/or icy, etc. For example, there could be a different lower sole member 140 for each sport played, such as football, soccer, rugby, etc., or within that sport, the number of cleats, the length of the cleats and, the shape of the cleats could be varied for each lower sole member 140 used. Also, the athlete may have multiple lower soles 140 for the same sport.

A further advantage of the present invention is its applicability to provide detachable breakaway systems for other uses, such as in breakaway supports for road signs, breakaway seats for military or civilian aircraft, a detachable power supply for a rocket booster apparatus or a space-shuttle, conveyor belt systems to prevent injuries to a worker's hands or feet, which prevents them from getting stuck in the belt apparatus, a breakaway stop mechanism for escalators when a person or object gets stuck in the escalator's moving stair, and a breakaway system for pulleys or fans.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. An athletic shoe with a detachable sole for preventing hip, leg, knee, ankle, and foot injuries, comprising:
    a) an upper sole member;
    b) a lower sole member detachably connected to the upper sole member and having a ground-contacting surface; said upper and lower sole members being substantially the same size;
    c) a plurality of latching mechanisms for detachably connecting said upper and lower sole members having movable latching members which extend from said upper sole member into said lower sole member;
    d) said latching members being movable between an extended latching position and a retracted release position in response to sensing means;
    e) means for holding said latching members in said extended latching position and means for releasing said latching members to said retracted release position;
    f) control means for releasing said holding means and for allowing said release means to move said latching members to said release position for detachably connecting said lower sole member from said upper-sole member when a shear force exceeds a preset level in response to sensing means; and
    g) sensing means for sensing the shear force applied to said lower sole member and for signaling said control means for moving said latching members to said release position.

2. An athletic shoe in accordance with claim 1, including a shoe body made of a material selected from the group consisting of canvas, nylon, leather, and plastic.

3. An athletic shoe in accordance with claim 2, wherein said shoe body further includes fastening means for fastening said shoe selected from the group consisting of laces, straps, buckles, clasps, and hoop and loop fasteners.

4. An athletic shoe in accordance with claim 1, wherein said latching mechanism includes a movable piston shaft, fluid means for moving said piston shaft to an extended engaged position, and spring means for moving said piston shaft to a retracted unengaged position.

5. An athletic shoe in accordance with claim 4, wherein said latching mechanism further includes curved tracking channels, pins movable relative to said curved tracking channels, and a fluid chamber in which said piston shaft moves.

6. An athletic shoe in accordance with claim 5, wherein said latching mechanism further includes locking bars and means for sensing the position of said locking bars.

7. An athletic shoe in accordance with claim 6, wherein said sensing means further includes a system-engage sensor contact point and electronic means for providing a signal when said piston is in an engaged position.

8. An athletic shoe in accordance with claim 1, wherein said sensing means includes an electronic sensor assembly having a movable sensor piston shaft, a fluid chamber for moving said sensor piston shaft to an engaged position, and spring means for moving said sensor piston shaft to a retracted position.

9. An athletic shoe in accordance with claim 8, wherein said electronic sensor assembly further includes a sensor piston head, support guide ribs, electronic sensor channels, and a fluid chamber for said sensor piston shaft.

10. An athletic shoe in accordance with claim 9, wherein said electronic sensor assembly further includes tapered angular surfaces having gauge wire leads for sensing the shear force within said sensor piston head.

11. An athletic shoe in accordance with claim 9, wherein said electronic sensor assembly further includes a lower housing section having tapered and angular-receiving recesses for receiving said sensor piston heads.

12. An athletic shoe in accordance with claim 1, further including a power supply mounted in said upper sole member.

13. An athletic shoe in accordance with claim 12, wherein said power supply is a 9-volt D.C. battery for supplying electrical power to said latching mechanisms, said sensing means, and said control means.

14. An athletic shoe in accordance with claim 1, wherein said control means includes a solid-state circuitry module having a plurality of integrated circuit-chip means.

15. An athletic shoe in accordance with claim 14, wherein said control means further includes a control circuit having a signal amplifier, a D.C. power supply transformer, a battery-life indicator, a system ON/OFF switch, an internal time adjuster, a release pressure potentiometer, a threshold-level indicator, a system-engage indicator, and a microprocessor with a timer.

16. An athletic shoe in accordance with claim 1, further including an adjustable release mechanism having an external visual display module and a plurality of pressure control means.

17. An athletic shoe in accordance with claim 16, wherein said adjustable release mechanism further includes a battery-life indicator, a system ON/OFF switch for ON/OFF switching, an internal time adjuster having means for increasing or decreasing the time setting; a release pressure potentiometer, and a threshold level indicator having means for increasing or decreasing the setting of a shear force value.

18. An athletic shoe in accordance with claim 1, further including a trigger release mechanism having an electrical solenoid for creating a magnetic field, and an internal microcheck ball valve for releasing fluid pressure.

19. An athletic shoe in accordance with claim 18, wherein said trigger release mechanism further includes a helix coil of copper wire surrounding an internal core wall, another helix coil of copper wire surrounding an external solenoid plunger shaft, both being used for the creation of a magnetic field, an internal solid-spool plunger with a driving element, and spring means for moving said plunger with said driving element to a retracted position of said electrical solenoid.

20. An athletic shoe in accordance with claim 18, wherein said trigger release mechanism includes a check ball valve and return spring means for moving said check ball valve to a closed position of said internal microcheck ball valve.

21. An athletic shoe in accordance with claim 1, further including a reservoir and bladder system having a main fluid reservoir with an expandable bladder for receiving fluid from a trigger mechanism, a gas-reservoir chamber section for the pressurization of fluid within the bladder, a microcheck ball valve having an intake port, and a microcheck ball valve with an intake port.

22. An athletic shoe in accordance with claim 21, wherein said reservoir and bladder system further includes fluids in the form of water, glycol, alcohol, or Freon.

23. An athletic shoe in accordance with claim 21, wherein said reservoir and bladder system further includes fluid means having fluids in the form of air, nitrogen, or neon.

24. An athletic shoe in accordance with claim 1, further including a manual reset mechanism having a manual pumping assembly for transferring fluid to other component parts, a fluid chamber for holding said fluid, and check valves for facilitating the transfer of said fluid to other component parts.

25. An athletic shoe in accordance with claim 24, wherein said manual reset mechanism further includes a pump plunger with a removable handle in conjunction with the plunger shaft having a pump header surface, a pump housing, and spring means for moving the plunger shaft.

26. An athletic shoe in accordance with claim 1, further including a fluid-flow control system having fluid-control means, including one-way microcheck valves, fluid-manifold devices, and a plurality of tubes for the transfer of pressurized fluid within the upper sole member of said athletic shoe.

27. An athletic shoe in accordance with claim 26, wherein said fluid-flow control system further includes a multi-tube manifold for outgoing fluid from a manual-reset mechanism to the plurality of latching mechanisms and to said sensing means, and a multi-tube collection manifold for incoming fluid from said latching mechanisms and said sensing means, which collect said fluid to be transferred into a trigger mechanism.

28. An athletic shoe in accordance with claim 1, wherein said lower sole member has cleats.

29. A detachable breakaway system, comprising:
a) a first member;
b) a second member detachably connected to said first member;
c) a plurality of latching mechanisms for detachably connecting said first and second members having movable latching members which extend from said first member into said second member;
d) said latching members being movable between an extended latching position an a retracted release position in response to sensing means;
e) means for holding said latching members in said extended latching position and means for releasing said latching members to said retracted release position;
f) control means for releasing said holding means and for allowing said release means to move said latching members to said release position for detachably connecting said second member from said first member when a shear force exceeds a preset level in response to sensing means; and
g) sensing means for sensing the shear force applied to said second member and for signaling said control means for moving said latching members to said release position, said sensing means including a system-engage sensor contact point and electronic means for providing a signal when said latching member is in an engaged position; and
h) a trigger release mechanism for releasing said latching member to said release position.

30. A detachable breakaway system in accordance with claim 29, wherein said latching mechanism includes a movable piston shaft, fluid means for moving said piston shaft to an extended engaged position, and spring means for moving said piston shaft to a retracted unengaged position.

31. A detachable breakaway system in accordance with claim 30, wherein said latching mechanism further includes curved tracking channels, pins movable relative to said curved tracking channels, and a fluid chamber in which said piston shaft moves.

32. A detachable breakaway system in accordance with claim 31, wherein said latching mechanism further includes locking bars and means for sensing the position of said locking bars.

33. A detachable breakaway system in accordance with claim 32, wherein said sensing means further includes a system-engage sensor contact point and electronic means for providing a signal when said piston is in an engaged position.

34. A detachable breakaway system in accordance with claim 29, wherein said sensing means includes an electronic sensor assembly having a movable sensor piston shaft, a fluid chamber for moving said sensor piston shaft to an engaged position, and spring means for moving said sensor piston shaft to a retracted position.

35. A detachable breakaway system in accordance with claim 34, wherein said electronic sensor assembly further includes a sensor piston head, support guide ribs, electronic sensor channels, and a fluid chamber for said sensor piston shaft.

36. A detachable breakaway system in accordance with claim 35, wherein said electronic sensor assembly further includes tapered angular surfaces having gauge wire leads for sensing the shear force within said sensor piston head.

37. A detachable breakaway system in accordance with claim 36, wherein said electronic sensor assembly further includes a lower housing section having tapered and angular-receiving recesses for receiving said sensor piston heads.

38. A detachable breakaway system in accordance with claim 29, further including a power supply for supplying electrical power to said latching mechanism and said sensing means.

39. A detachable breakaway system in accordance with claim 29, said control means further includes a control circuit having a signal amplifier, a D.C. power supply transformer, a battery-life indicator, and a system ON/OFF switch.

40. A detachable breakaway system in accordance with claim 29, further including an adjustable release mechanism having an external visual display module and a plurality of pressure control means.

41. A detachable breakaway system in accordance with claim 29, further including a trigger release mechanism having an electrical solenoid for creating a magnetic field, and an internal microcheck ball valve for releasing fluid pressure.

* * * * *